Jan. 3, 1939.   T. H. SLOAN   2,142,158
METHOD OF AND APPARATUS FOR STENCILING
Filed Jan. 7, 1937    13 Sheets-Sheet 1

INVENTOR.
T. H. Sloan,
BY
Rule & Hoge
ATTORNEYS.

Jan. 3, 1939. T. H. SLOAN 2,142,158
METHOD OF AND APPARATUS FOR STENCILING
Filed Jan. 7, 1937 13 Sheets-Sheet 5

INVENTOR.
T. H. Sloan,
BY Rule & Hoge
ATTORNEYS.

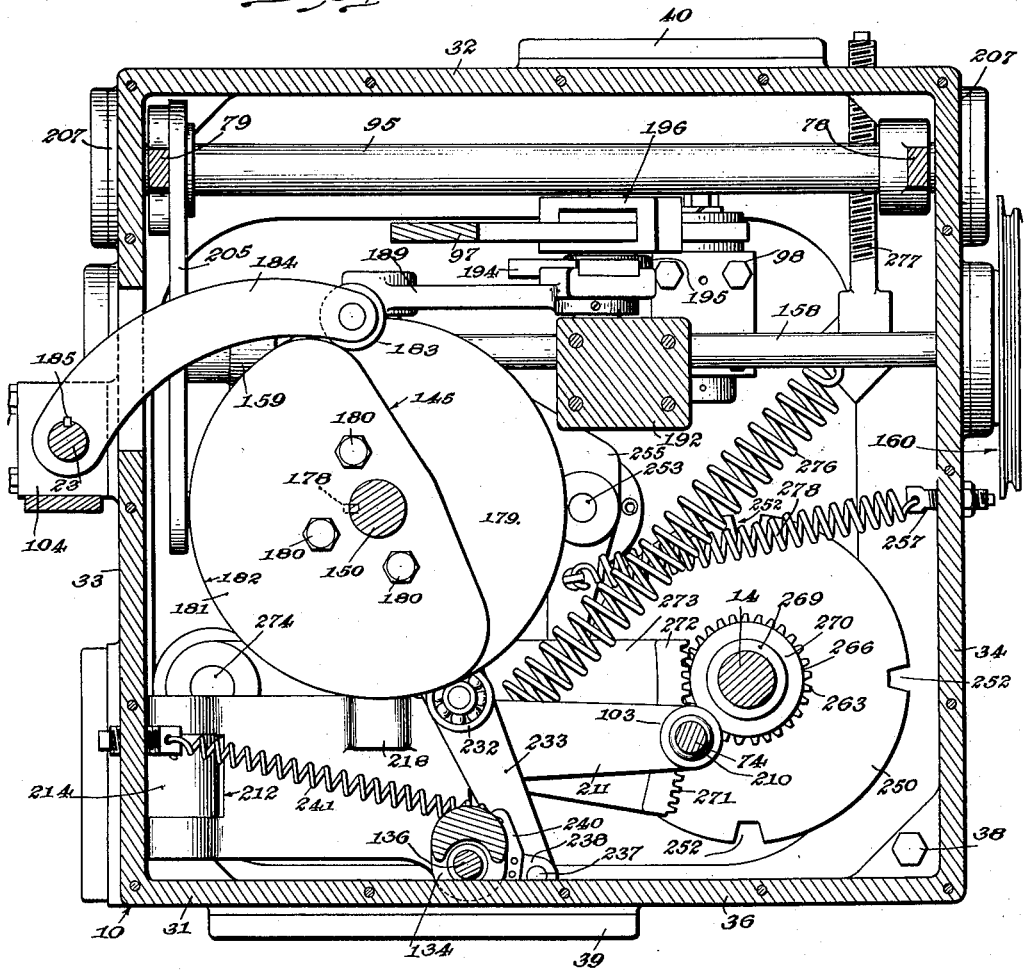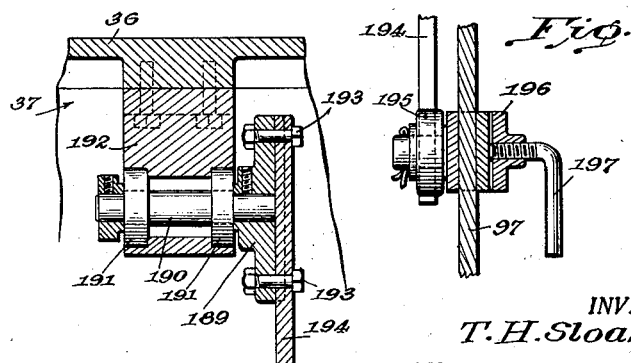

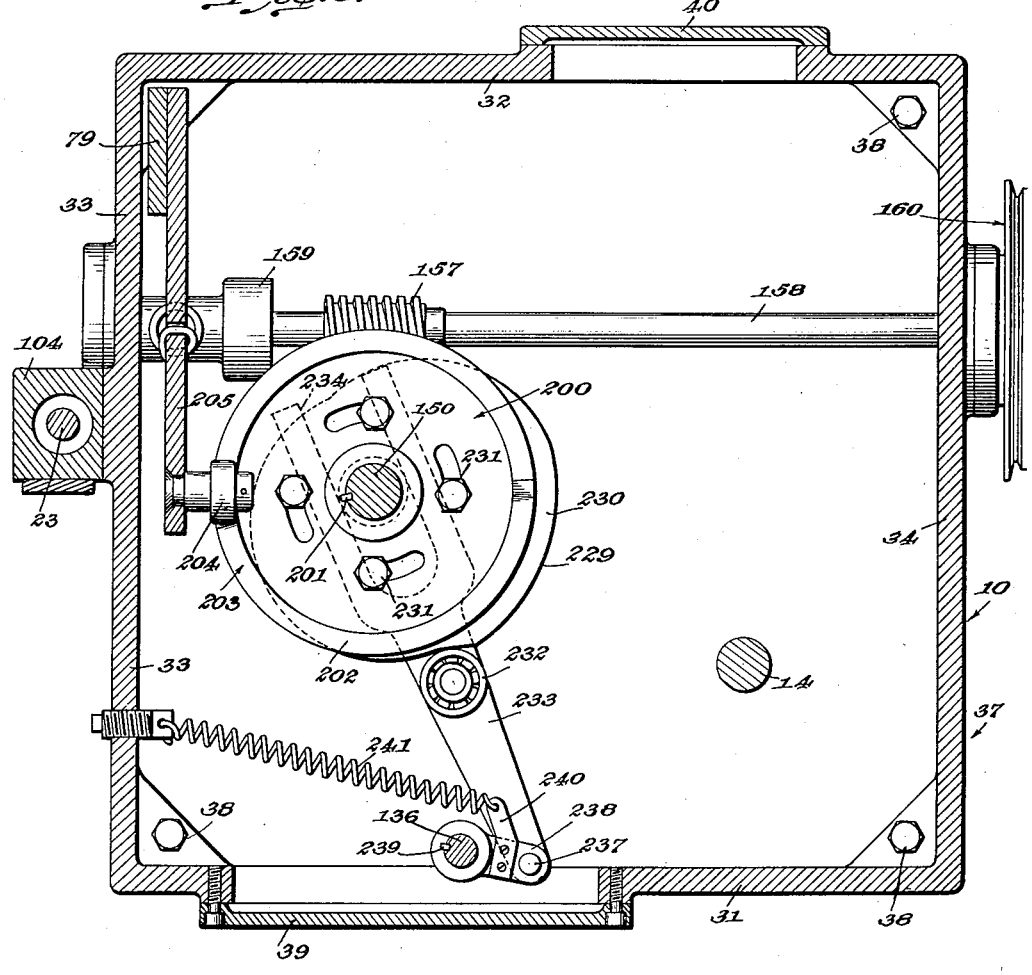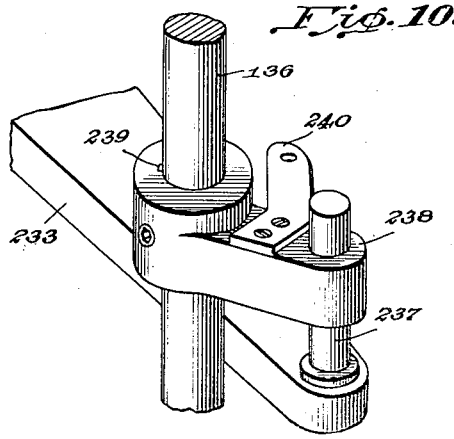

Jan. 3, 1939. T. H. SLOAN 2,142,158
METHOD OF AND APPARATUS FOR STENCILING
Filed Jan. 7, 1937 13 Sheets-Sheet 8

INVENTOR.
T. H. Sloan,
BY
Rule & Hoge
ATTORNEYS.

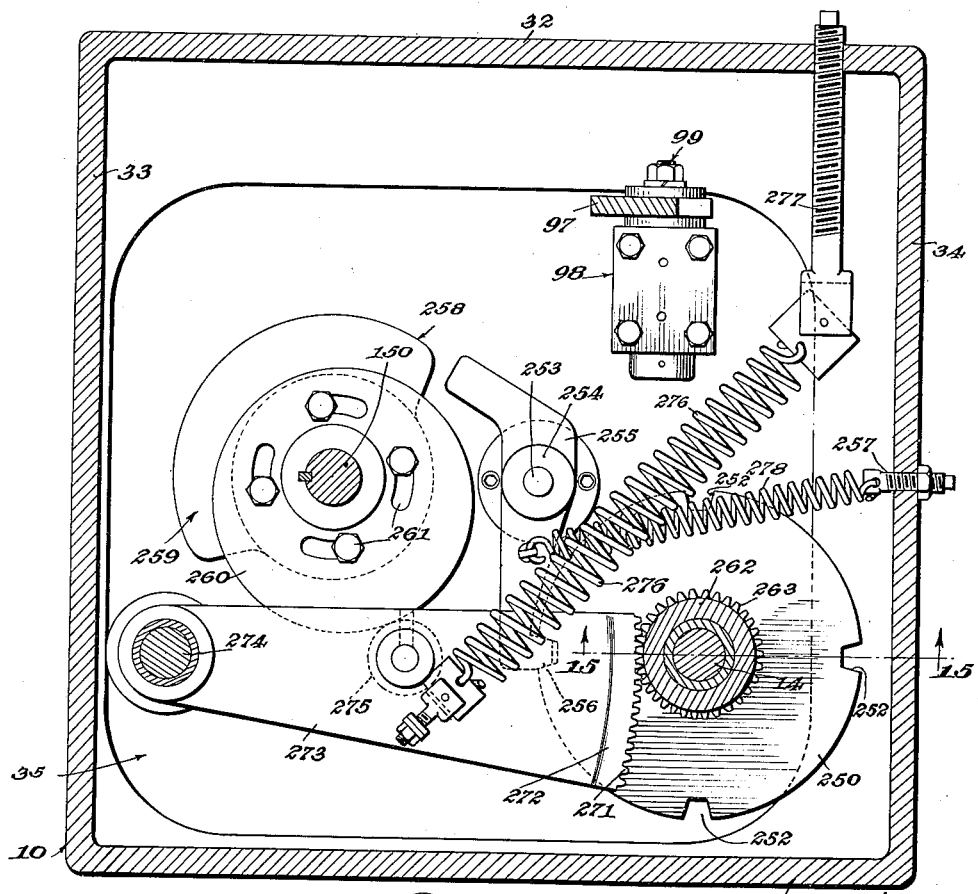
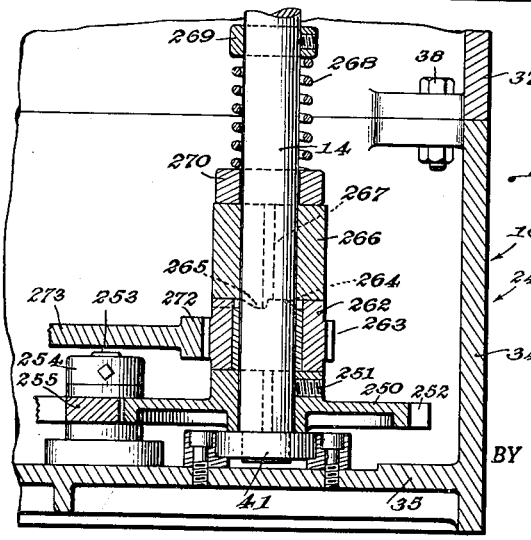

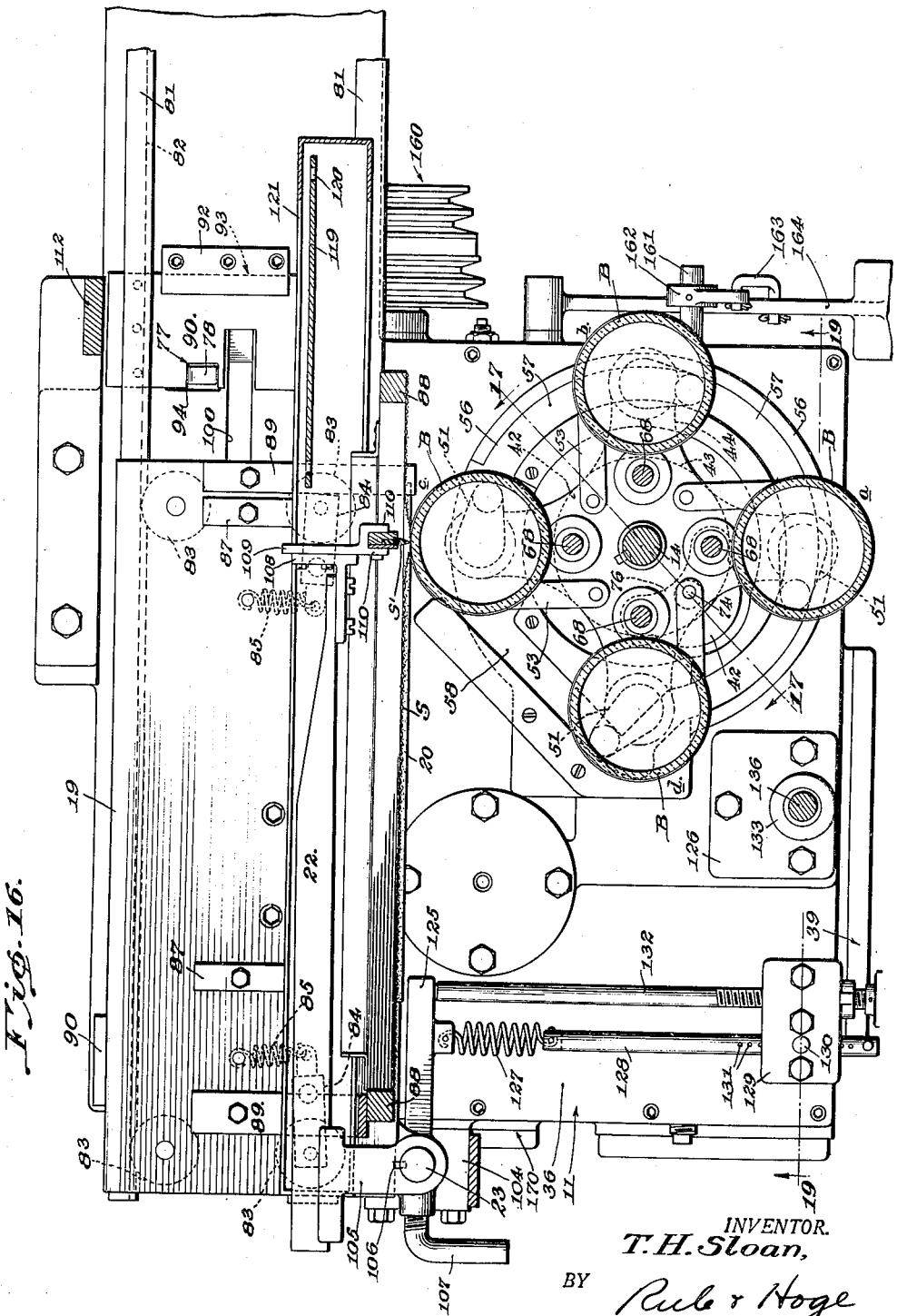

Jan. 3, 1939. T. H. SLOAN 2,142,158
METHOD OF AND APPARATUS FOR STENCILING
Filed Jan. 7, 1937 13 Sheets-Sheet 11

INVENTOR.
T. H. Sloan,
BY Rule & Hoge
ATTORNEYS.

Jan. 3, 1939. T. H. SLOAN 2,142,158
METHOD OF AND APPARATUS FOR STENCILING
Filed Jan. 7, 1937 13 Sheets-Sheet 12

INVENTOR.
T. H. Sloan,
BY Rule & Hoge
ATTORNEYS.

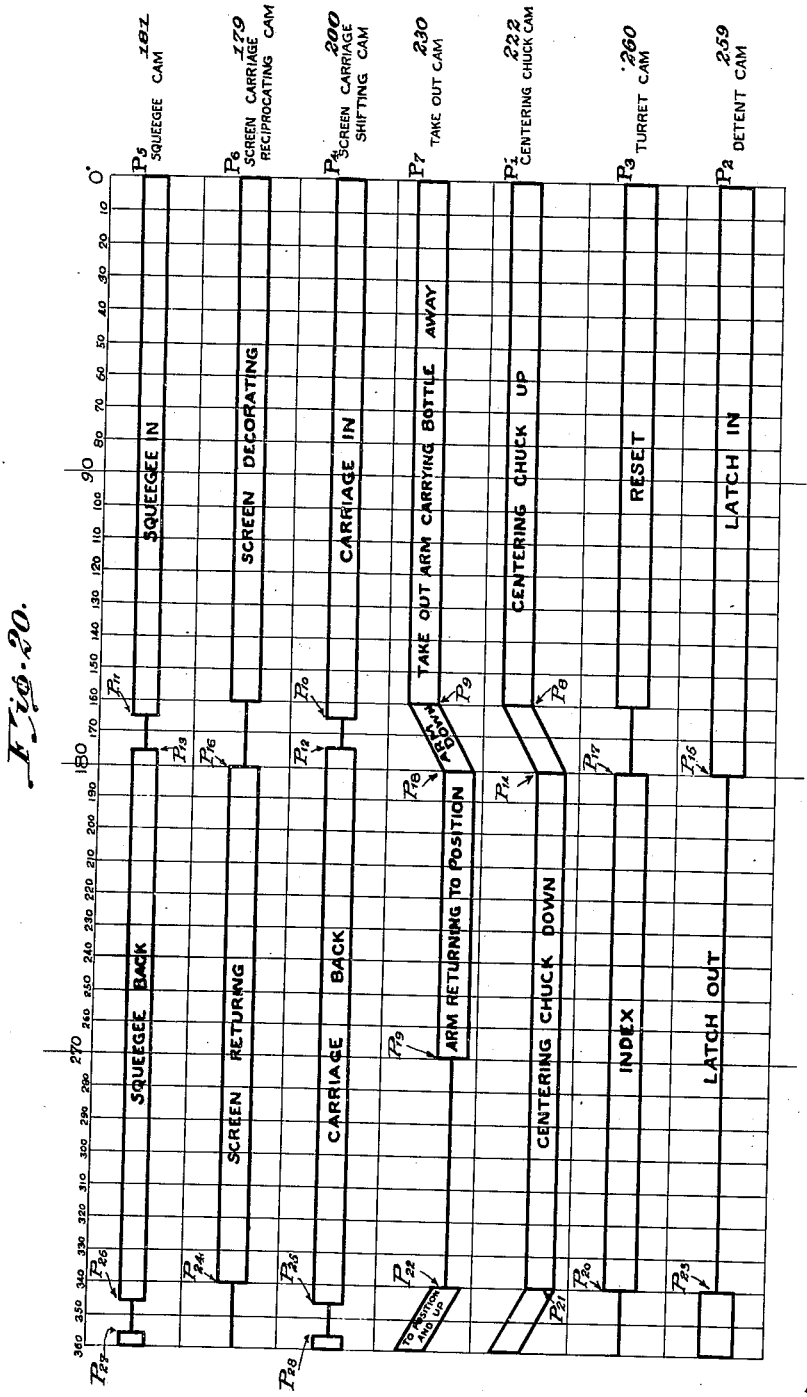

Patented Jan. 3, 1939

2,142,158

UNITED STATES PATENT OFFICE 2,142,158

METHOD OF AND APPARATUS FOR STENCILING

Theodore H. Sloan, Charleroi, Pa., assignor to Simplex Engineering Company, a corporation of Delaware Application January 7, 1937, Serial No. 119,487

18 Claims. (Cl. 101—124)

The stenciling apparatus comprising the present invention is primarily adapted for use in applying a vitreous enamel composition or paint to articles of glassware such as bottles, jars and the like in the lettering or decorating thereof by a stenciling process. The apparatus is especially designed for use in the lettering or decorating of the cylindrical sides of milk bottles.

The principal object of the invention is to provide a fully automatic machine which will receive the undecorated milk bottles in an upright position; convey the same in an upright position successively to a decorating or lettering station; orient the individual bottles about a vertical axis for proper cooperation with the decorating or lettering instrumentalities; apply the decoration or lettering to the bottles; and convey the decorated bottles from the decorating or lettering station and deliver the same from the machine in an upright position.

Another object of the invention is to provide a method of and an apparatus for stenciling, wherein a vertically disposed stencil screen which is capable of movement in its own vertical plane is moved horizontally while in rolling contact with the surface of an article to be decorated while at the same time decorating material is applied to the surface of the article through the screen by the spreading action of a squeegee which is maintained in contact with the screen along the vertical line of contact between the screen and surface undergoing decoration.

A still further object of the invention is to provide a novel form of dispensing mechanism for supplying the vertically disposed stencil screen with decorating material for application therethrough to the article by the spreading action of the squeegee.

Other objects and advantages of the invention, not at this time more particularly enumerated, will become more readily apparent as the nature of the invention is better understood.

In the accompanying drawings:

Fig. 6 is a sectional view taken substantially along the line 6—6 of Fig. 3;

Fig. 7 is a sectional view taken substantially along the line 7—7 of Fig. 3;

Fig. 8 is a sectional view taken substantially along the line 8—8 of Fig. 3;

Fig. 9 is a sectional view taken substantially along the line 9—9 of Fig. 3;

Fig. 10 is an enlarged fragmentary perspective view of a crank arm and connections therefor shown in the preceding figure;

Fig. 14 is a sectional view taken substantially along the line 14—14 of Fig. 3;

Fig. 15 is a sectional view taken substantially along the line 15—15 of Fig. 14;

Fig. 16 is a sectional view taken substantially along the line 16—16 of Fig. 1;

Fig. 20 is a diagrammatic view, graphic in its representation, illustrating the manner in which the various operative machine elements are controlled by the angular position of a series of controlling cams mounted upon a common main operating shaft.

BRIEF DESCRIPTION OF MACHINE

Figure 1:
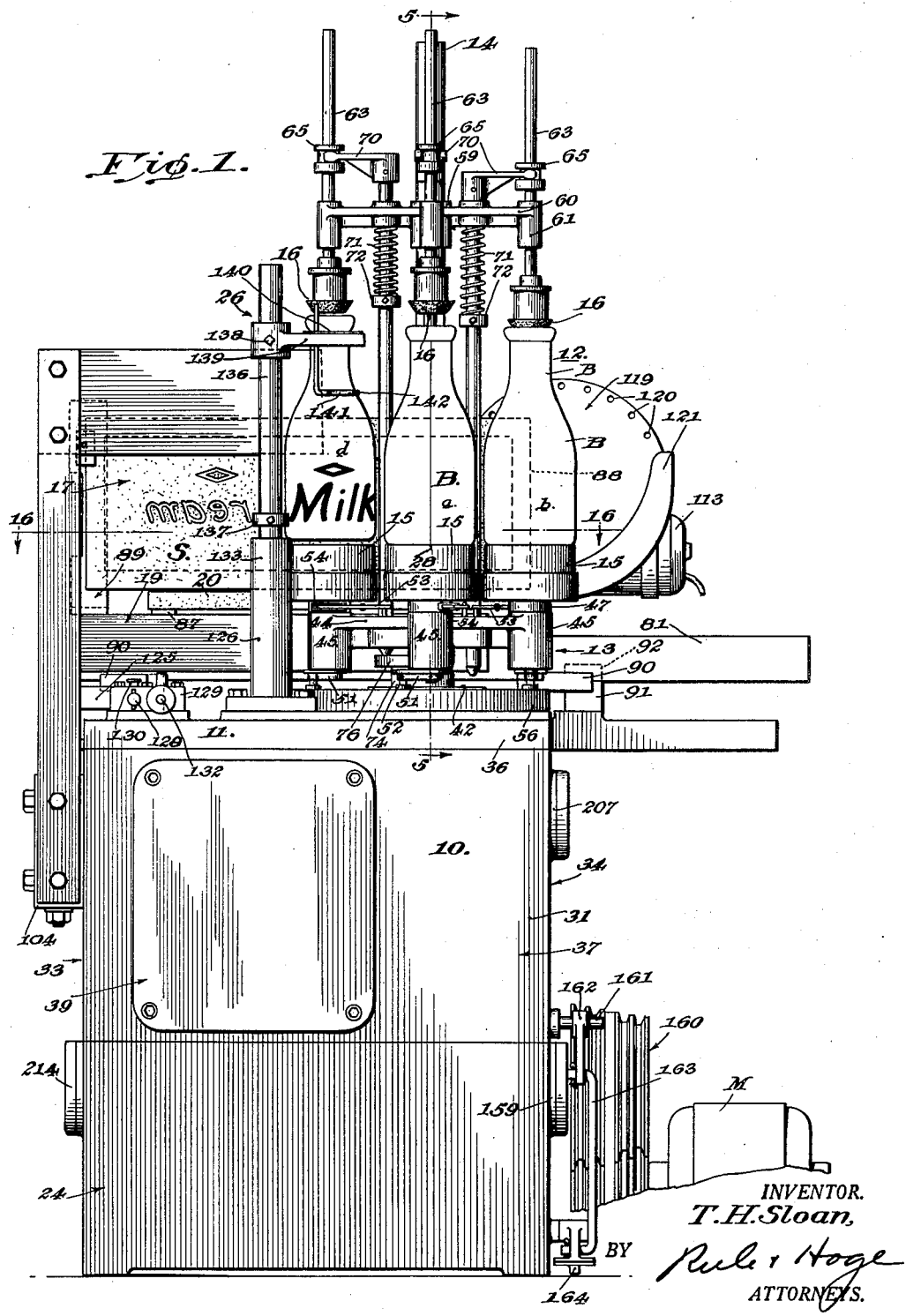
Fig. 1 is a front elevational view of an assembled bottle decorating machine manufactured in accordance with the principles of the present invention.
Figure 5:
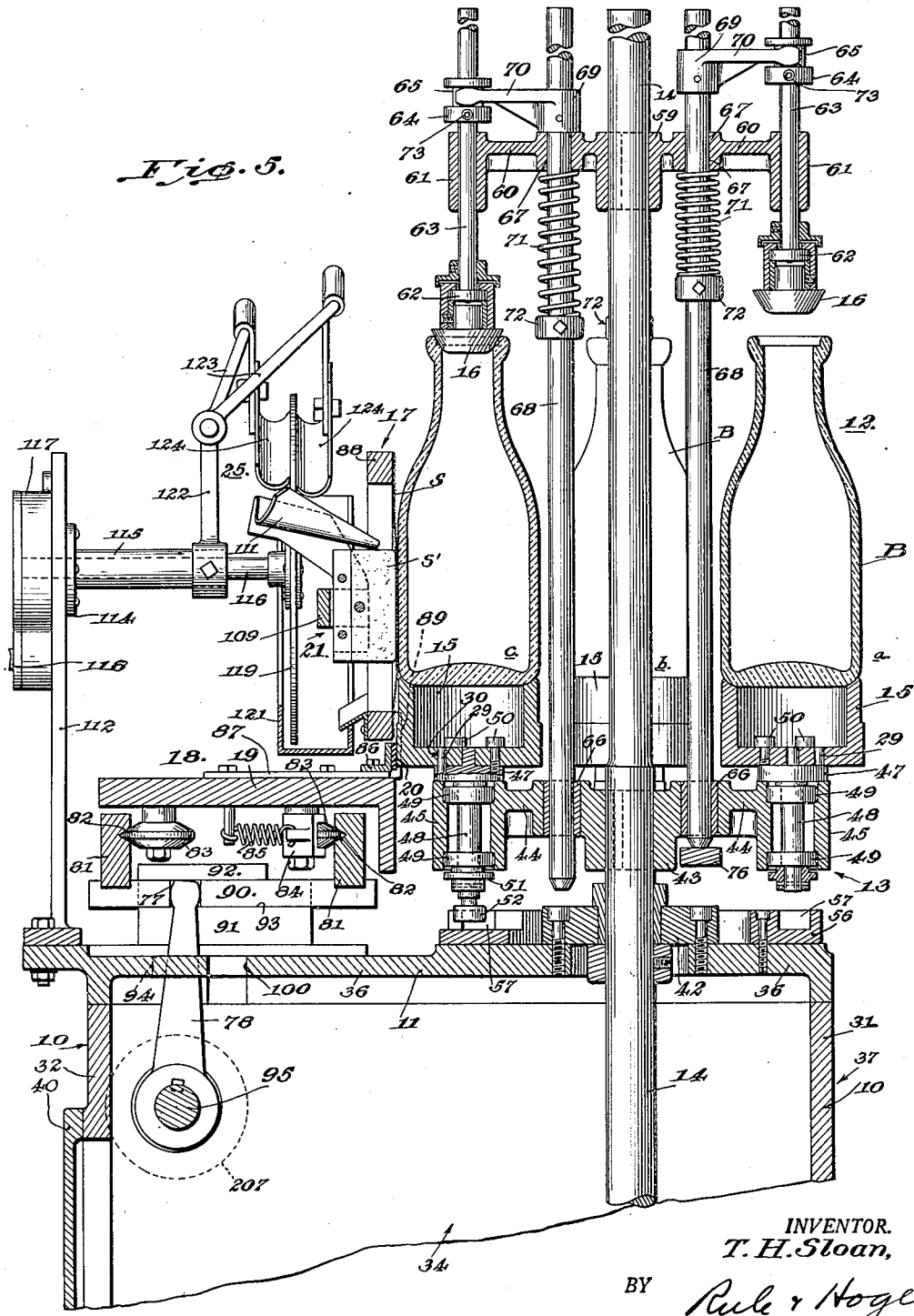
Fig. 5 is a sectional view taken substantially along the line 5—5 of Fig. 1.

Referring now to Figs. 1 and 5, the apparatus briefly comprises a rectilinear casing 10 in which is housed a major portion of the operative mechanical driving connections or instrumentalities of the apparatus. The casing 10 includes a table portion 11, on or above which the various bottle supporting and decorating instrumentalities are supported. The bottle supporting assembly is designated in its entirety at 12 and consists of a rotary chuck supporting turret 13 in the form of a spider mounted on a vertical turret shaft 14 above the table 11. Supporting chucks 15 are rotatably carried by the turret 13 and each chuck is adapted to support thereon in an upright position a milk bottle B to be decorated. The bottles B are centered upon the chucks 15 and are maintained thereon in such centered relation by means of a plurality of centering chucks 16 suitably supported in axial alignment with the bottle openings. As will be described in detail later, means is provided for periodically indexing the turret shaft 14 and turret 13 to bring the bottles B supported thereby into decorating position in contact with a stencil screen S which forms an element of a stencil screen assembly 17.

The stencil screen assembly 17 is supported above the table 11 in the vicinity of the bottle supporting assembly 12 and includes the vertically disposed horizontally reciprocable stencil screen S which is periodically movable toward and away from the bottle supporting assembly 12 and which is designed to make tangential rolling line contact with the cylindrical sides of successive bottles B successively presented to it upon each successive indexing operation of the turret 13.

In order to establish such tangential rolling line contact between the stencil screen S and the bottles B undergoing decoration, means is provided for rotating each chuck 15 during the actual decorating operation, and toward this end a chuck rotating assembly 18 is supported above the table 11 in the vicinity of the bottle supporting assembly 12. The chuck rotating assembly 18 includes a reciprocable carriage 19 which carries a friction element 20 designed to engage the chucks 15 during the decorating operation and, by rolling line contact therewith, impart rotary motion to the same. The carriage 19 is periodically movable toward and away from the bottle supporting assembly 12 in synchronism with the movements of the stencil screen S in a manner subsequently to be described.

A squeegee assembly 21 is supported above the table 11 in the vicinity of the stencil screen assembly 17 and includes a squeegee S' (Fig. 16) which is carried by the outer end of a squeegee arm 22 which is mounted upon a vertical shaft 23 for horizontal swinging movement toward and away from the bottle supporting assembly 12. The squeegee S' is designed to contact the stencil screen S along the rolling line of contact between the screen and bottle undergoing decoration and is held stationary during reciprocation of the screen in order that decorating material may be forced through the interstices of the screen by the spreading action of the squeegee.

The shaft 23 is adapted to be periodically actuated in timed relation to the actuation of the stencil screen assembly 17 in such a manner that the squeegee S' will clear the screen upon completion of each decorating operation.

A dispensing mechanism 25 for the decorating material to be applied to the bottles B is positioned in the vicinity of the stencil screen assembly 17 behind the screen S. The dispensing mechanism 25 is adapted to supply decorating material to the screen continuously during the operation of the apparatus in a manner that will be fully described hereinafter.

Upon completion of each decorating operation, the decorated bottles B are removed from the machine in an upright position by means of a bottle ejecting mechanism 26 which is supported above the table 11.

GEAR CASING

Figure 2:
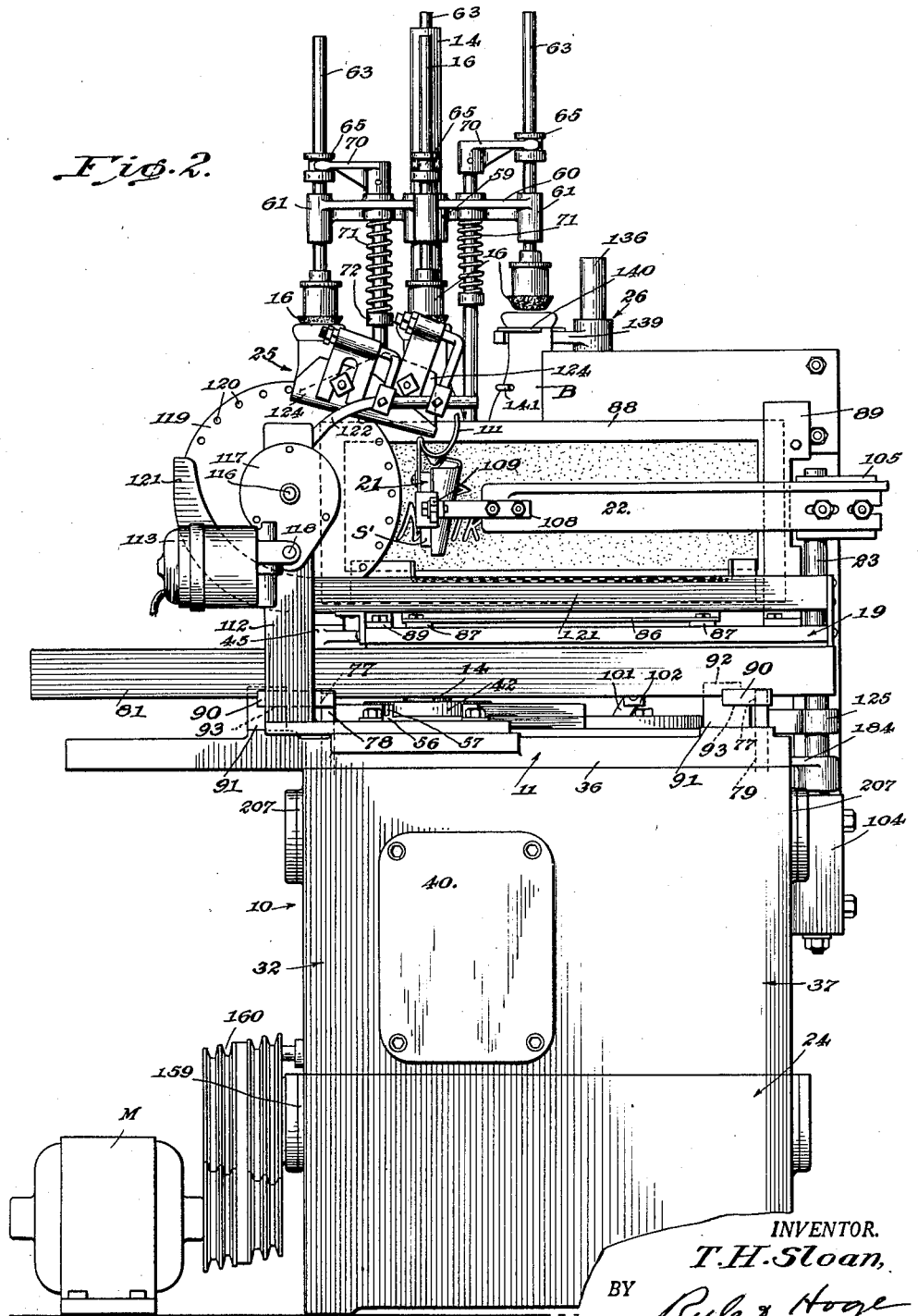
Fig. 2 is a rear elevational view of the machine shown in Fig. 1.
Figure 3:
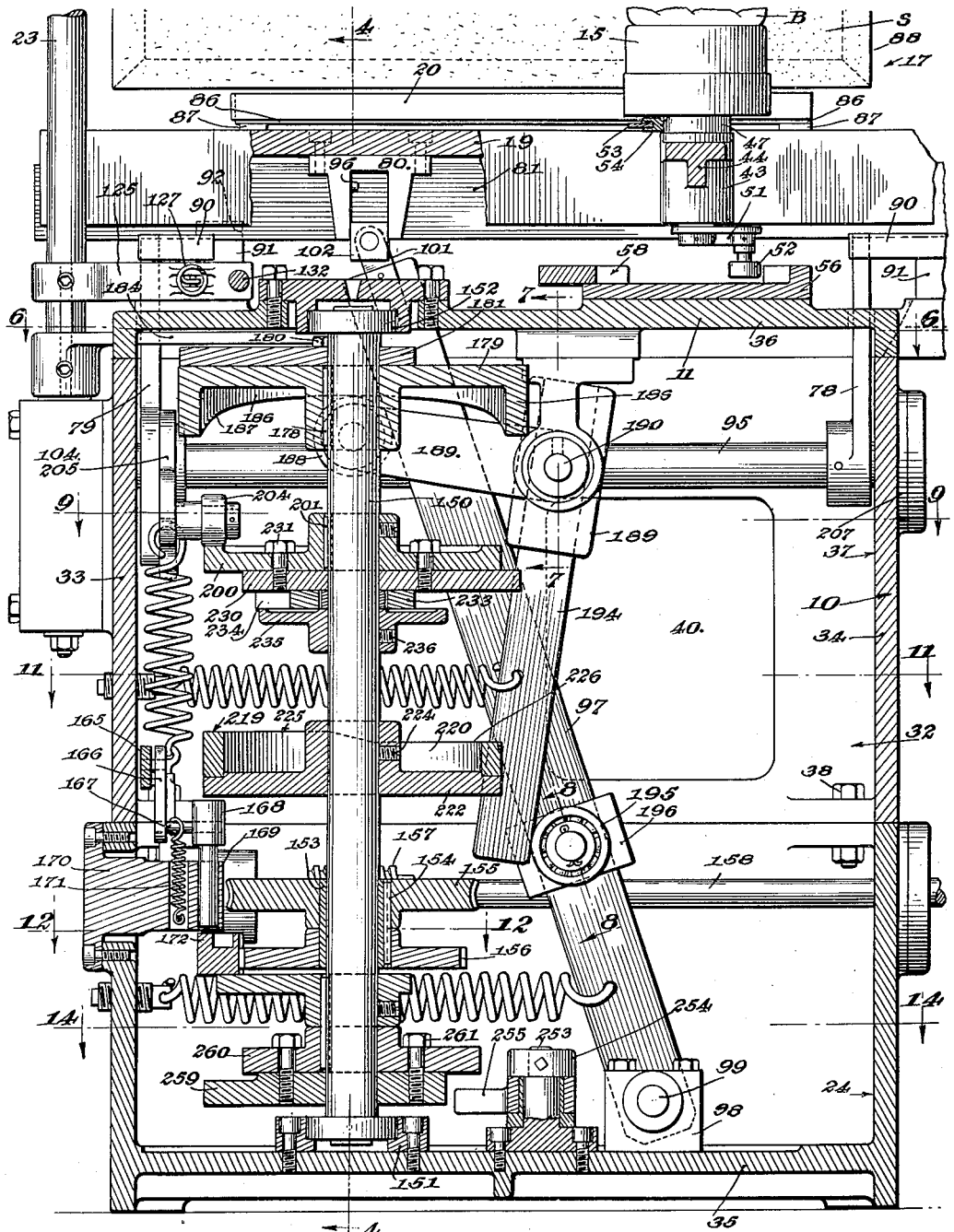
Fig. 3 is a vertical sectional view taken transversely through the machine centrally of a main cam shaft employed for controlling the operation of the various bottle moving and decorating instrumentalities employed in connection with the present invention.

Referring now to Figs. 1 and 3, the gear casing 10 is generally of rectilinear form and is provided with a front wall 31, a rear wall 32, side walls 33 and 34, a bottom 35, and a top or cover 36. The cover 36 provides the table 11 or support upon which, or above which, the various bottle supporting and decorating instrumentalities are supported. The casing 10 consists of a lower section 24 and an upper section 37 superimposed thereon and secured thereto by means of suitable flange and bolt constructions 38. The casing 10 is designed to enclose and protect the major portion of the operative driving instrumentalities as well as providing a housing for lubricant with which it is partially filled. The front and rear walls 31 and 32 are provided with removable cover plates 39 and 40 respectively (Figs. 1, 2 and 3) for the purpose of inspection, adjustment, repair or replacement of parts contained within the casing 10.

BOTTLE SUPPORTING ASSEMBLY

Figure 17:
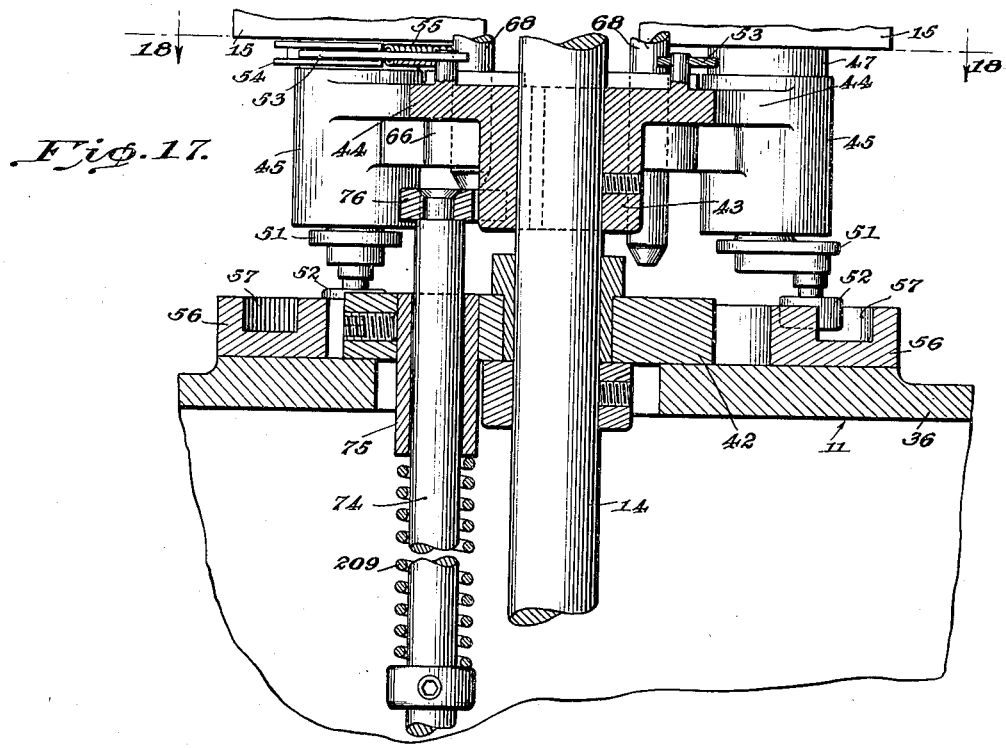
Fig. 17 is a sectional view taken substantially along the line 17—17 of Fig. 16.

Referring to Figs. 1, 5, 15 and 16, the bottle supporting assembly 12 is supported above the table 11 upon the previously mentioned vertically extending turret shaft 14. The lower end of the turret shaft 14 is rotatably mounted in a bearing 41 (Fig. 15) secured interiorly of the casing 10 upon the bottom 35 thereof. The turret shaft 14 extends vertically through the casing 10 and projects upwardly thereabove a considerable distance, it being supported medially of its ends in a bearing 42 carried by the cover 36. The chuck supporting turret 13 is in the form of a spider having a central hub portion 43 from which there extends radially a plurality of arms 44, the outer ends of which have formed thereon a corresponding number of vertically extending sleeves 45. In the present instance, four such arms 44 and sleeves 45 have been disclosed, but it is to be distinctly understood that a greater or a lesser number may be employed if desired. Each arm 44 carries at its outer end one of the bottle supporting chucks 15 in the form of a cup-shaped member which is secured centrally to a face plate 47 formed on a shank 48 that extends vertically through a respective sleeve 45 in which it is rotatably supported by means of roller bearings 49. The chuck 15 is secured to the face plate 47 by means of studs 50. The lower end of each shank 48 projects completely through its respective sleeve 45 and the projecting end thereof has mounted thereon an eccentric crank 51 (Fig. 17) provided with an eccentrically positioned roller 52 on its underneath side.

Figure 18:
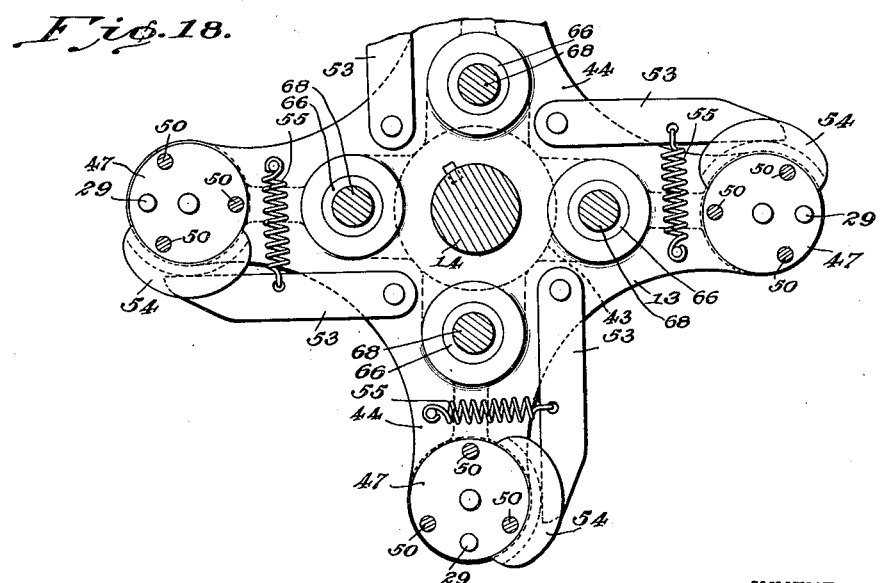
Fig. 18 is a sectional view taken substantially along the line 18—18 of Fig. 17.

A plurality of brake rods 53 (Fig. 18), one for each chuck 15, are secured at their inner ends to the chuck supporting turret 13 and extend radially outwardly therefrom. Each brake rod 53 is provided at its outer end with a brake shoe 54 which bears against a respective face plate 47 which in effect provides a braking surface for the brake shoe 54. Coil springs 55 normally urge the brake shoes 54 into engagement with the face plates 47 to retard independent rotational movement thereof.

As will be subsequently described, the shaft 14 upon which the bottle supporting assembly 12 is mounted is adapted to be periodically indexed in such a manner that the chucks 15 are moved from a receiving station *a* to an intermediate position *b*, from the intermediate position *b* to a decorating station c, and from the decorating station c to a discharging station d.

Extending centrally around the shaft 14, spaced therefrom, and secured to the table 11, is a substantially circular rack 56 having formed thereon an arcuate groove 57 in which the four rollers 52 are adapted to ride upon turning movement of the shaft 14 during indexing of the same.

The groove 57 is discontinued in the vicinity of the decorating station c and thus, at this station, the chucks 15 are capable of independent rotation about their respective axes during the actual decorating operation as will be described hereinafter. Upon movement of the chucks 15 from the decorating station c to the discharging station d, the rollers 52 enter a straightaway portion 58 of the groove 57 which serves as a guide for introducing the rollers 52 into the arcuate portion of the groove 57.

In the decoration of the bottles B, it is essential that the decoration be applied to the bottles on either side of the mold seam, ordinarily occurring on the exterior surface thereof. Each chuck 15 is provided with a score mark 28 or other indicia with which the bottle seams are adapted to be aligned in placing the bottles on the chucks 15 in an upright position at the receiving station a. In order that the mark 28 shall be presented outwardly for the convenience of the operator who feeds the machine, pins 29 formed on the face plates 47 register with sockets 30 provided in the base of the chucks 15 and these pins 29 and sockets 30 are so formed that when the rollers 52 occupy a position within the groove 57 at the receiving station a, the marks 28 are presented forwardly toward the operator.

In the operation of the machine the bottles B are successively and individually placed upon respective chucks 15 arriving at the receiving station in the manner just described. Immediately thereafter, the shaft 14 is indexed and the chuck at the receiving station a, together with the bottle B thereon, is moved from the station a to the position b.

In order to maintain the bottles B on their respective chucks 15 during indexing of the chuck supporting turret 13, the centering chucks 16, previously referred to, are brought into operation. The centering chucks 16 correspond in number to the number of chucks 15. The chucks are suspended by means of plungers 63 above the level of the bottle openings in axial alignment therewith. Toward this end, the upper end of the vertical turret shaft 14 has mounted thereon a supporting spider 59 possessing radially extending arms 60 which correspond in number to the number of plungers 63. The outer ends of the arms 60 are provided with vertically extending guides 61 through which the plungers 63 extend and in which they are vertically slidable. The lower ends of the plungers 63 have mounted thereon ball bearings 62 from which the centering chucks 16 are rotatably suspended. The chucks 16 are adapted, upon lowering of the plungers 63, to engage the surrounding walls of the bottle openings and maintain the bottles B in position upon their respective chucks 15.

In order to elevate or lower the centering chucks 16 into or out of engagement with the bottles B, each plunger 63 has secured thereto adjacent its upper end a collar 64 having an annular groove 65 formed therein. The chuck supporting turret 13 and spider 59 are provided with a series of vertically aligned guides 66 and 67 respectively in the radial portions 44 and 60 thereof, and a vertically extending thrust rod 68 is vertically slidable in each pair of guides. Each thrust rod 68 has secured thereto adjacent its upper end a sleeve 69 from which there extends radially a bifurcated arm 70, the bifurcations of which straddle one of the collars 64 and are received within the groove 65 thereof. The centering chucks 16 are normally held in their bottle engaging position by means of coil springs 71 which surround the thrust rods 68 and which bear at their upper ends against the spider 59 and at their lower ends against thrust collars 72 that are mounted on the thrust rods 68.

In order to accommodate various sizes of bottles, for example, pint or quart size milk bottles or half-pint cream bottles, the grooved collars 64 are slidably adjustable on their respective plungers 63 by means of set screws 73.

Figure 19:
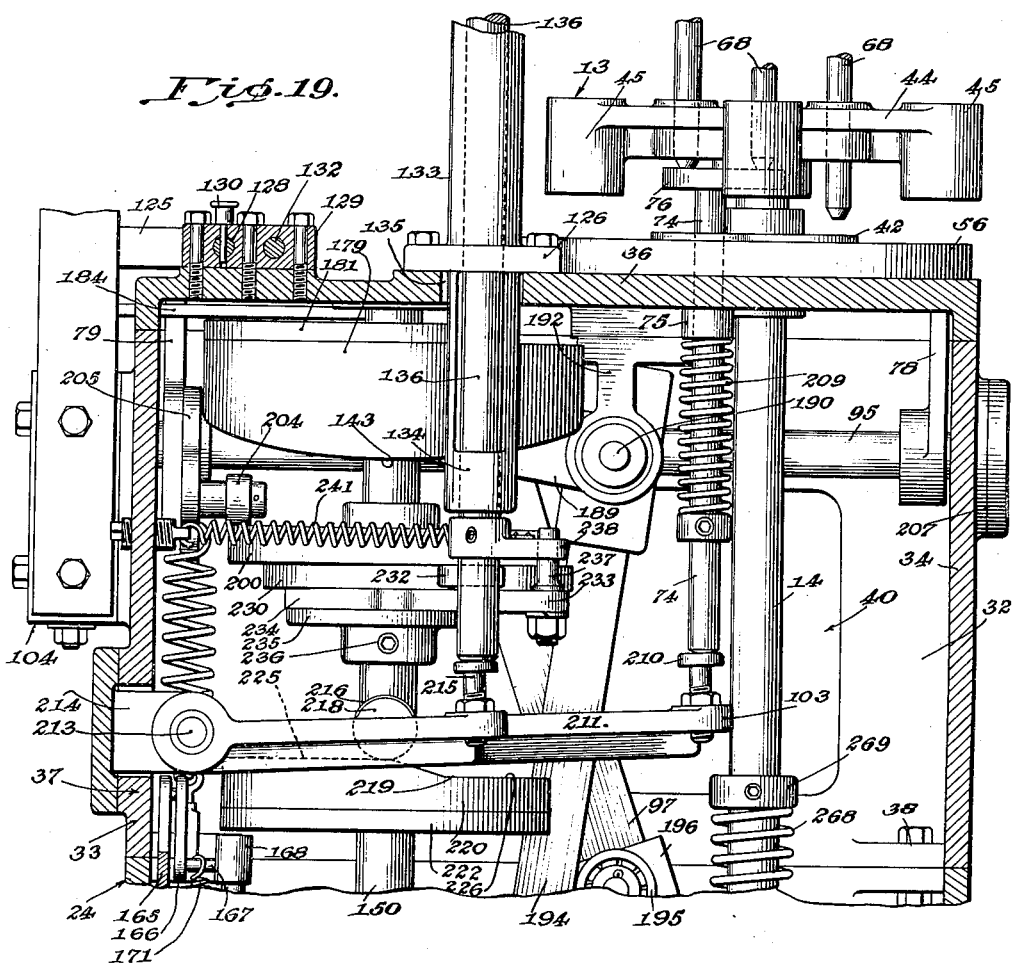
Fig. 19 is a sectional view taken substantially along the line 19—19 of Fig. 16.

Referring now to Figs. 16 and 19, wherein the means for periodically elevating and lowering the centering chucks 16 is disclosed, the lower ends of the thrust rods 68 project through the guides 66 provided in the radial portions 44 of the chuck supporting turret 13 and are adapted to be elevated periodically upon arrival of the respective bottle chucks, with which the thrust rods 68 are associated, at the discharging station d or at the receiving station a. Toward this end, a vertically slidable plunger 74 projects through a guide 75 extending through the cover 36 of the casing 10 at a point in the vicinity of both the discharging station d and the receiving station a. A curved lifting plate or cross-head 76 is provided on the upper end of the plunger 74 and underlies the ends of adjacent thrust rods 68 when the associated chucks 15 are in bottle discharging and bottle receiving positions at the stations c and a.

It will be seen that upward movement of the plunger 74 will cause the curved cross-head 76 to engage the lower ends of the thrust rods 68 and elevate the same, thus causing the bifurcated arms 70 carried by the upper ends of the thrust rods 68 to elevate the plungers 63 and centering chucks 16 carried thereby. The mechanism for periodically actuating the plungers 74 is contained within the gear casing 10 and will be described subsequently.

CHUCK ROTATING AND STENCIL SCREEN ASSEMBLIES

The stencil screen and chuck rotating assemblies 17 and 18 (Figs. 2, 3, 5 and 16) are rigidly secured to each other and move in unison, whether the movement thereof be toward and away from the bottle supporting assembly 12, or whether the movement be reciprocal for the purpose of decorating the bottles B. As has been previously set forth, when the bottles B carried by the supporting chucks 15 are, upon indexing of the chuck supporting turret 13, brought into decorating position at the decorating station c, the entire stencil screen assembly 17 and chuck rotating assembly 18 are adapted to be moved toward the bottle supporting assembly 12 in such a manner that the screen S contacts the particular bottle about to be decorated along a vertical line of contact prior to reciprocating movement of the stencil screen while at the same time the friction element 20 engages the particular chuck which supports the bottle about to be decorated.

The chuck rotating assembly 18 consists of the previously mentioned reciprocable carriage 19 which is mounted upon tracks 81 for longitudinal reciprocation therealong. The tracks 81 extend longitudinally of the machine from one end thereof to the other, and each track is provided with a coextensive groove 82 on the inner side thereof, in which grooves a plurality of pairs of rollers 83, carried by the carriage 19, are adapted to ride and form a rolling support for the carriage. The axes of the rollers 83 extend in a vertical plane to take care of any side thrust existing by virtue of the contact between the friction element 20 and chuck 15. The inner rollers 83 of each pair, i. e., the rollers nearest the bottle supporting assembly 12, are mounted upon the outer ends of corresponding links 84 which are pivoted medially of their ends. The other ends of the links 84 are yieldingly drawn outwardly by the action of coil springs 85 to normally urge the rollers 83 into the groove 82 provided on the inner track 81. The friction element 20 is in the form of an elongated strip of rubber which is mounted upon an angle piece backing 86 which is secured to the upper surface of the carriage 19 by means of brackets 87.

The stencil screen assembly comprises a vertically disposed rectangular screen frame 88 to which the stencil screen S is secured on one side thereof in any suitable manner, as, for example, by glueing. The screen frame 88 is supported above the carriage 19 by means of angle brackets 89. The screen S is positioned substantially in the plane of the friction element 20, the former making tangential rolling line contact with the bottle B and the latter making tangential rolling line contact with the chuck 15 when the chuck rotating and stencil screen assemblies are moved toward the bottle supporting assembly to an operative decorating position.

The tracks 81 are secured in parallel relationship to a pair of transversely reciprocable supporting blocks 90. The blocks 90 are slidably supported upon a pair of supports 91 which are mounted upon the table 11. The supports 91 have secured thereto, overlying portions 92 which, together with the supports 91 form grooves 93 therebetween, in which grooves the blocks 90 are slidable. The blocks 90 are provided with slots 77 (Figs. 4 and 5), into which slots there project the free ends of a pair of spaced reciprocating crank arms 78 and 79 which extend through slots 94 provided in the cover 36 of the casing 10 and which are mounted radially upon a longitudinal rock-shaft 95 contained within the casing. The shaft 95 is adapted to be oscillated periodically in a manner subsequently to be described in order to cause the stencil screen S and friction element 20 to engage the side of the bottle B undergoing decoration and the supporting chuck 15 therefor respectively.

In order to cause longitudinal reciprocation of the chuck rotating and stencil screen assemblies 18 and 17 respectively, the underneath side of the carriage 19 has suspended therefrom a transversely extending bracket 80 which is provided with a groove 96 therein. A tiltable reciprocable arm 97 is pivotally secured at its lower end in a bearing block 98 by means of trunnions 99. The upper end of the arm 97 projects through an elongated longitudinally extending slot 100 provided in the cover 36 of the casing 10. A bracket 101, secured to the upper end of the arm 97, has a thrust block 102 pivotally mounted thereon. The thrust block 102 extends into the groove 96 provided in the bracket 80 and serves, upon reciprocation of the arm 97, to cause horizontal reciprocation of the carriage 19. The mechanism for causing reciprocation of the tiltable arm 97 is contained within the casing 10 and will be described subsequently.

SQUEEGEE ASSEMBLY

Referring now to Figs. 3, 5 and 16, the previously mentioned vertically extending shaft 23 is rotatably journalled in a bearing box 104 and projects upwardly above the level of the table 11 adjacent the rear edge thereof. A vertically adjustable swinging support 105 is keyed as at 106 to the shaft 23 and is adapted to be secured above the level of the table 11 in any desired adjusted position by means of a set screw 107. The squeegee arm 22 is secured to the support 105 at the outer end thereof and extends longitudinally of the machine behind the screen S. The free end thereof has secured thereto a bracket 108 to which a squeegee holder 109 is in turn secured. The holder 109 is provided with a pair of parallel extending flanges 110 between which the squeegee proper S' is pivoted for limited rocking movement. An inclined trough 111 is supported in any suitable manner from the squeegee holder 109 above the same and is so oriented that decorating material supplied to it will flow from the lower edge thereof onto the screen S in the immediate vicinity of the squeegee blade S' and to one side thereof so that upon movement of the screen relative to the squeegee during the operative decorating stroke thereof, the enamel composition is forced through the pervious portions of the screen and onto the bottle B undergoing decoration at the decorating station c.

The squeegee S' is normally held in yielding contact with the stencil screen S and toward this end, an arm 125 (Figs. 3 and 16), is rigidly secured to the shaft 23 and extends inwardly and overlies the table 11. A coil spring 127 is secured at one end to the arm 125 and is anchored at its other end to a rod 128 which is axially adjustable in a bearing block 129. A pin 130 extends through the block 129 and is adapted to be selectively received in any one of a number of longitudinally aligned holes 131 provided in the rod 128. The coil spring 127 normally urges the squeegee assembly, including the arm 125, the shaft 23, and the squeegee arm 22 about the axis of the shaft 23 in such a manner that the squeegee S' bears against the screen S with varying degrees of pressure, depending upon the setting of the rod 128 in the bearing block 129.

An elongated set screw 132, which is adjustably mounted in the bearing block 129, projects into the path of the arm 125 to limit the swinging movement of the arm 125. Thus, by manipulation of the set screw 132, the squeegee may be properly adjusted to the screen S for efficient decoration of the bottles B.

PAINT DISPENSING MECHANISM

The paint dispensing mechanism 25 for supplying enamel composition or other decorating material to the stencil screen S is best illustrated in Figs. 2 and 5. The table 11 has mounted thereon adjacent the rear edge thereof a standard or support 112 upon which there is mounted adjacent its upper end an electric motor 113. A face plate 114 secured to the support 112 has a sleeve 115 integrally formed thereon. The sleeve 115 extends horizontally and inwardly of the machine and serves to rotatably support therein a shaft 116 which is operatively connected through a gear reduction device 117 to the driving shaft 118 of the electric motor 113. The shaft 116 projects beyond the end of the sleeve 115 and has mounted thereon a disk 119. A series of holes 120 are formed in the peripheral regions of the disk 119. A container 121 for the enamel composition or other decorating material is secured to the reciprocable carriage 19 in any suitable manner. The disk 119 extends into the container 121 and the lower edge thereof extends into a pool of enamel composition contained within the container 121. Upon rotation of the disk 119, the enamel composition adheres to the perforate regions thereof and is carried upwardly thereon. Adjustably and pivotally mounted upon a bracket 122 which is secured to the sleeve 115 are a pair of supports 123, from which supports are suspended a pair of inclined arcuate scrapers 124. The scrapers 124 positioned on opposite sides of the disk 119 and the adjacent edges thereof bear against the opposite sides of the disk 119 in the peripheral region thereof in such a manner that the enamel composition adhering to the disk is removed therefrom and transferred to the inclined arcuate scrapers 124. Each scraper 124 in effect provides an inclined trough from which the enamel composition transferred thereto is adapted to issue.

The enamel composition issuing from the scrapers 124 is deposited on the trough 111 from whence it flows onto the screen S in the vicinity of the squeegee S' as previously described.

BOTTLE EJECTING MECHANISM

Referring now to Figs. 1 and 19, a guide member 126 is secured to the table portion 11 of the casing. The guide member 126 is provided with an upwardly projecting sleeve portion 133 and a downwardly projecting sleeve portion 134, which latter portion extends through a slot 135 provided in the casing cover 36 and projects into the casing. A vertically extending shaft 136 extends completely through the sleeves 133 and 134 of the guide member 126 and projects upwardly therefrom a substantial distance. The shaft 136 is capable of both rotational movement and vertical sliding movement in the guide member 126. The lowermost position of the shaft 136 is limited by means of an adjustable collar 137 which is secured thereto and which is designed for engagement with the upper end of the sleeve 133. Adjustably secured as at 138 to the shaft 136 for vertical adjustment thereon near the upper extremity thereof, is a bottle take out or bottle ejecting or take out arm 139 having a bifurcated plate 140 secured thereto at its free end. The bifurcations of the plate 140 are adapted to straddle the neck portions of the bottles that have been decorated in the machine below the annular bead customarily provided thereon for the purpose of elevating the same from the supporting chucks 15. In order to prevent swinging of the bottles when they are suspended from the bifurcated plate 140, a comparatively rigid wire rod 141 extends downwardly from the plate 140 and is bent into arcuate form as at 142 to partially encircle the lower region of the neck portion of the bottle being removed from the machine to steady the same as the arm 139 is swung outwardly away from the bottle chucks 15 in the ejecting of bottles in the manner subsequently to be described.

MAIN OPERATING SHAFT AND DRIVING CONNECTIONS THEREFOR

Figure 12:
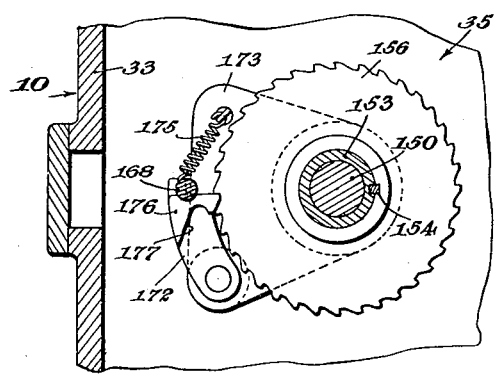
Fig. 12 is a sectional view taken substantially along the line 12—12 of Fig. 3.
Figure 13:
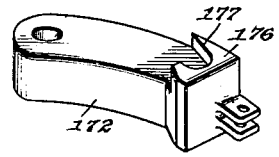
Fig. 13 is an enlarged perspective view of a locking pawl which forms an element of a clutch mechanism employed in connection with the present invention.

Referring now to Figs. 1, 3, and 12, a vertically extending main operating shaft 150 is rotatably journalled in the casing 10 and is supported in bearings 151 and 152 mounted on the bottom 35 and cover 36 thereof respectively. Mounted upon the shaft 150 and freely rotatable thereon is a sleeve 153. Keyed as at 154 to the sleeve 153 for rotation therewith are an upper worm gear 155 and a lower ratchet wheel 156. The sleeve 153, worm gear 155 and ratchet wheel 156 comprise a unitary assembly which is adapted to be driven continuously by means of a worm 157 (Fig. 3) which is mounted on a horizontal shaft 158 mounted in bearings 159 carried by the side walls 33 and 34 of the gear casing 10 and which meshes with the worm gear 155. The shaft 158 is driven continuously through a variable speed belt and pulley mechanism 160 of standard design by means of an electric motor M preferably mounted exteriorly of the casing 10.

Normally, motion of the shaft 158 which in turn transmits motion to the unitary worm gear and ratchet wheel assembly 155, 156 is not transmitted to the main operating shaft 150. However, by operating a treadle mechanism, the operating portion of which is mounted on the casing 10 exteriorly thereof, the operator of the apparatus is enabled to establish a driving connection between the horizontal shaft 158 and the main operating shaft 150. Toward this end, a substantially horizontal treadle shaft 161 extends transversely through the casing 10 and is rotatably supported in the side walls 33 and 34 thereof. The shaft 161 projects from the casing 10 and has secured thereto exteriorly of the casing 10 an actuating arm 162 which is connected through a link 163 to a treadle 164 which is positioned for convenient access to the operator of the machine. Depression of the treadle 164 by the foot of the operator will impart slight rocking movement to the shaft 161 through the link 163 and actuating arm 162.

Figure 4:
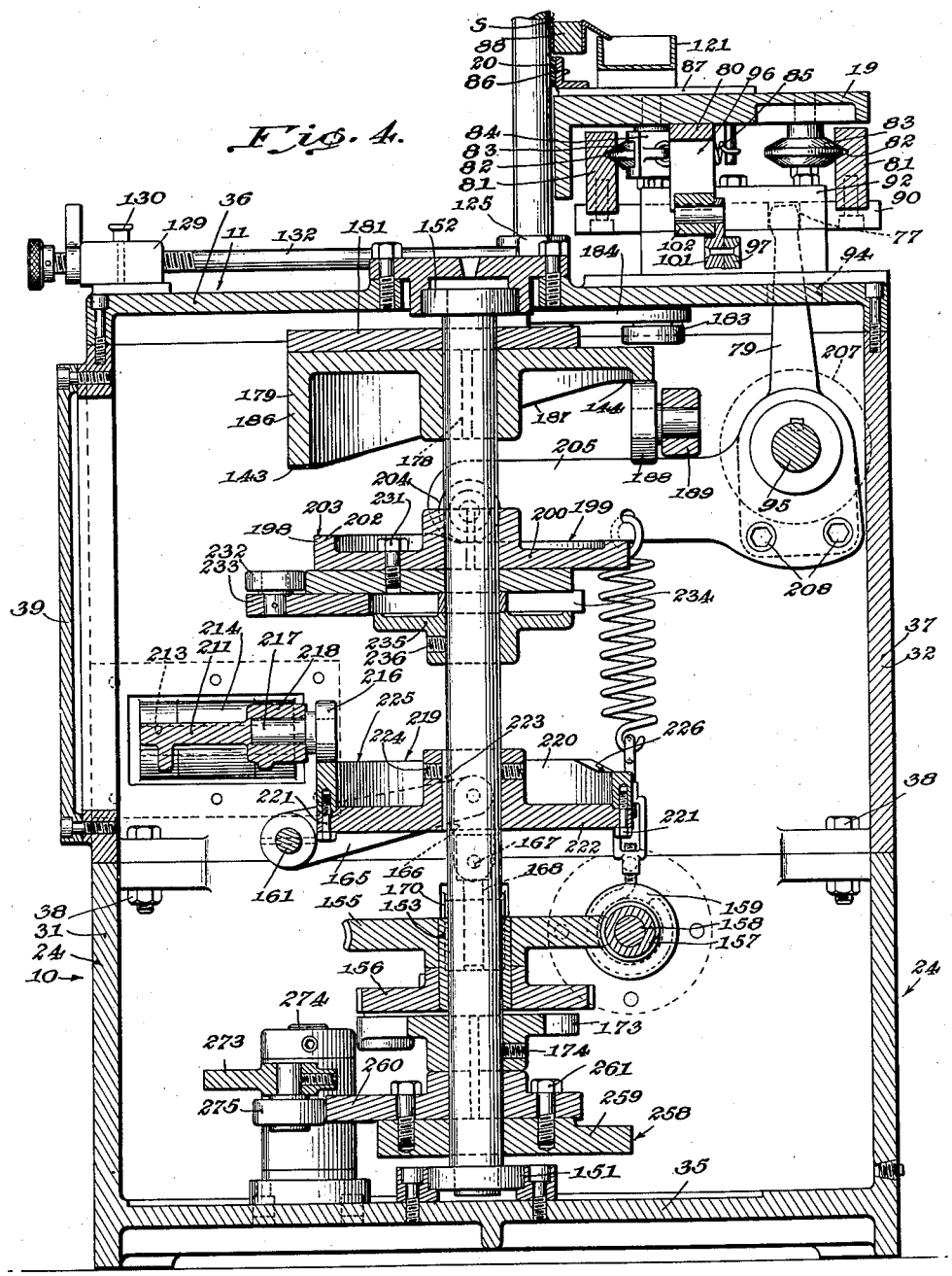
Fig. 4 is a sectional view taken substantially along the line 4—4 of Fig. 3.
Figure 11:
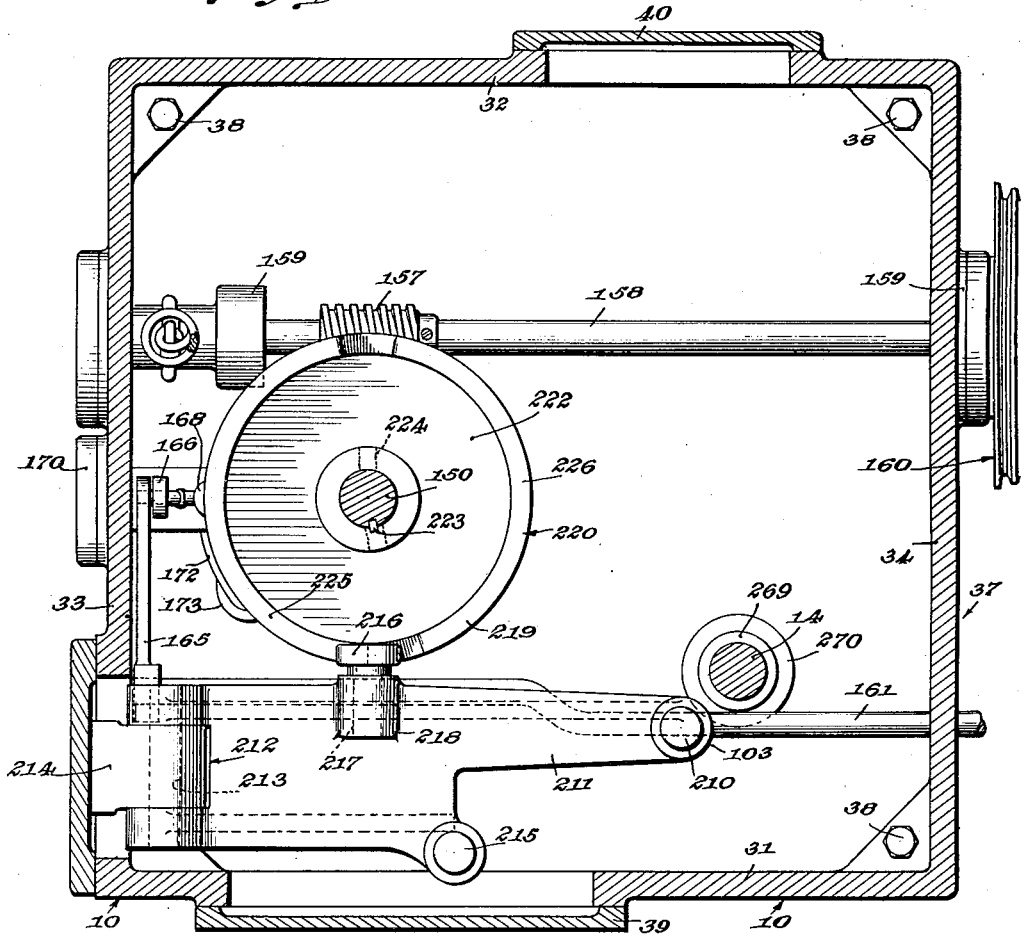
Fig. 11 is a sectional view taken substantially along the line 11—11 of Fig. 3.

Secured to the shaft 161 within the casing 10 and in the vicinity of the main operating shaft 150 is a suspension arm 165 (Figs. 3, 4 and 11). The outer end of the arm 165 is connected to a suspension link 166, the lower end of which link is provided with a laterally projecting pin 167 from which there is pivotally suspended a vertically and downwardly extending latch pin 168, the lower portion of which is guided in a bore 169 provided in a guide member 170 supported on the side wall 33 of the casing 10. A coil spring 171, one end of which is secured to the pin 167 and the other end of which is secured to the guide member 170, serves to normally maintain the latch pin 168 in its lowermost position with the extreme end thereof projecting completely through the bore 169 provided in the guide 170. Upon depressing the treadle 164, limited rocking movement is imparted to the shaft 161 in the manner previously described, and such rocking movement serves to elevate the suspension link 166 and latch pin 168 carried thereby and retract the projecting end of the latter.

Normally, when the latch pin 168 is in its extended position, it projects into the path of a pivoted pawl 172, one end of which is pivotally connected to a substantially triangular torque plate 173 (Figs. 4 and 12) through which plate the vertical main operating shaft 150 extends adjacent one corner thereof and to which it is anchored by means of a set screw 174. The torque plate 173 is thus eccentrically mounted on the shaft 150 and its free outer peripheral edge projects beyond the periphery of the ratchet wheel as clearly shown in Fig. 12. The pawl 172 is pivoted to the torque plate 173 adjacent one corner thereof and is normally urged into engagement with the toothed periphery of the ratchet wheel 156 by means of a coil spring 175. The free end of the pawl 172 is provided with an upstanding dog 176 having a cam surface 177 formed thereon.

The torque plate 173, being keyed to the main operating shaft 150, is designed for rotation about the axis of the same in unison with the ratchet wheel 156 when the pawl 172 is in engagement with the periphery of the latter. The projecting end of the pin 168 when the latter is extended from the guide 170, extends into the path of the dog 176 and engages the cam surface 177 thereof in such a manner that the pawl is drawn outwardly from the periphery of the ratchet wheel 156 against the action of the spring 175, thus releasing the driving connection between the ratchet wheel 156 and torque plate 173. When the projecting end of the pin 168 is retracted into the guide member 170, the pawl 172 is released and the coil spring 175 causes the free end of the latter to be drawn into engagement with the periphery of the ratchet wheel 156 to establish driving connection between the ratchet wheel 156 and the torque plate 173 to set the main operating shaft 150 into motion.

OPERATING INSTRUMENTALITIES FOR THE SQUEEGEE ASSEMBLY

Referring now to Figs. 3, 4, and 6, the upper end of the main operating shaft 150 has keyed thereto as at 178 a substantially circular cam 179 which forms an element of one of the screen operating mechanisms subsequently to be described. Secured to the cam 179 (Fig. 6) by means of studs 180 and rotatable therewith, is a second cam 181, hereinafter referred to as the squeegee cam. The squeegee cam 181 is provided with an outer arcuate cam surface 182 and an inner cam surface 145. The periphery of the squeegee cam 181 is designed for contact with a roller 183 mounted upon the free end of a curved, horizontally disposed arm 184 which is keyed as at 185 to the previously mentioned vertically extending shaft 23 upon which the squeegee assembly 21 is mounted. The coil spring 127 (Fig. 16) serves to yieldingly apply a torque to the shaft 23 through the medium of the arm 125 in such a manner that the arm 184 and roller 183 are urged into operative engagement with the cam 181. Thus it will be seen that as the main operating shaft 150 is rotated, the arm 184 is periodically oscillated in such a manner that the squeegee arm 22 (Fig. 16) which is mounted on the shaft 23 is periodically moved into and out of engagement with the stencil screen S.

OPERATING INSTRUMENTALITIES FOR CAUSING RECIPROCATION OF THE STENCIL SCREEN FRAME AND CHUCK ROTATING CARRIAGE

Referring now to Fig. 3, the previously mentioned cam 179, which will hereinafter be referred to as the carriage reciprocating cam, is provided with a depending apron 186, the lower edge of which is provided with a cam surface 187 having a crest portion 143 and a trough portion 144 designed for contact with a cam roller 188 mounted upon the free end of an arm 189 which is mounted at its other end for swinging movement about the axis of a stub shaft 190. The stub shaft 190 is rotatably journaled by means of anti-friction bearings 191 (Fig. 7) in a suspension bracket 192 supported from the cover 36 of the casing 10. Secured as at 193 to the arm 189, in such a manner as to form a bell crank lever therewith, is a depending arm 194, the free lower end of which is adapted to engage a cam roller 195 in the form of an antifriction member mounted on a bracket 196 (Fig. 8) which is longitudinally adjustable on the previously mentioned reciprocable arm 97 and which is adapted to be secured in any desired adjusted longitudinal position thereon by means of a set screw 197. It will be seen that upon rotation of the main driving shaft 150, the cam roller 188, riding upon the cam surface 187 of the cam 179, causes the bell crank lever provided by the arms 189 and 194 to be reciprocated about the axis of the stub shaft 190 (Fig. 7), thus imparting reciprocal movement to the arm 97 which causes reciprocation of the chuck rotating carriage 19 (Fig. 5) through the medium of the block and slot connection 96, 102 previously referred to.

OPERATING INSTRUMENTALITIES FOR MOVING THE STENCIL SCREEN FRAME AND CHUCK ROTATING CARRIAGE INTO AND OUT OF DECORATING POSITION

Referring now to Figs. 3 and 9, a horizontal carriage shifting cam 200 is keyed as at 201 to the main operating shaft 150 directly beneath the cam 179. The cam 200 is provided with an upwardly extending flange 202, the upper edge of which provides a cam surface 203 having an elevated portion 198 and a lower portion 199 designed for contact with a cam roller 204 mounted on the free end of an arm 205 which is secured at its other end to the previously mentioned horizontal transverse rock-shaft 95 which is supported for rocking movement in bearings 207 carried by the sides 33 and 34 of the casing 10. The previously mentioned crank arm 79 is secured by means of studs 208 to the arm 205 adjacent one end of the rock-shaft 95 while the arm 78 is anchored to the rock-shaft 95 adjacent the other end thereof. The two crank arms 78 and 79 extend upwardly through the cover 36 of the casing 10 and extend into the slots 77 provided in the blocks 90. It will be seen that upon rotation of the main operating shaft 150, the roller 204, riding upon the cam surface 203 of the cam 200, imparts periodic rocking movement to the rock-shaft 95 through the medium of the arm 205. Such rocking movement of the rock-shaft 95 imparts reciprocal motion to the chuck rotating carriage 19 and stencil screen frame 88 through the medium of the crank arms 78 and 79 in the manner previously described.

OPERATING INSTRUMENTALITIES FOR RAISING AND LOWERING THE BOTTLE EJECTING MECHANISM AND THE CENTERING CHUCK UNITS

Referring now to Figs. 4, 11 and 19, the previously mentioned vertically slidable plunger 74, (Fig. 19), which carries at its upper end the curved lifting plate or cross-head 76 for elevating the centering chuck units is normally and yieldingly held in its lowermost position by means of a coil spring 209 which surrounds the same. The lower end of the plunger 74 is supported upon a vertically adjustable lifting pin 210 which is mounted in a boss 103 provided on the extreme outer end of a substantially horizontal hinged lifting plate 211. The other end of the lifting plate 211 is bifurcated as at 212 and is supported upon trunnions 213 which extend outwardly from the opposite sides of a support 214 which is secured in any suitable manner to the side wall 33 of the casing 10.

The projecting lower end of the vertically slidable and rotatable shaft 136 which forms a part of the bottle ejecting or bottle take off mechanism 26 is supported upon a lifting pin 215 which is similar to the lifting pin 210 and which is mounted upon the lifting plate 211 medially of the ends thereof.

In order to cause periodic reciprocation of the lifting plate 211 about the axis of the trunnions 213 and thus cause periodic raising and lowering of both the plunger 74 and shaft 136 which control the movements of the centering chucks 16 and the bottle ejecting mechanism 26, a cam roller 216 is mounted upon a pin 217 which is received in a boss 218 provided medially on the lifting plate 211. The roller 216 is designed for contact with a cam surface 219 provided on a cam ring 220 removably secured as at 221 to a circular cam 222 hereinafter referred to as the centering chuck cam or lifting cam which is keyed as at 223 to the main operating shaft 150 and which is vertically adjustable thereon by means of a set screw 224. The cam surface 219 of the cam ring 220 is provided with elevated portions 225 and lower portions 226. The elevated portions 225 represent the elevated position of the centering chucks 16 during movement of the bottles from the discharging station $d$ to the receiving station $a$, and also represent the simultaneously elevated position of the bottle ejecting mechanism 26. The lower portions 226 represent the lowered positions of the centering chucks 16 and the bottle ejecting mechanism 26 during movement of the empty bottle supporting chucks 15 from the discharging station $d$ to the receiving station $a$. Thus it will be seen that as the main operating shaft 150 is rotated, the lifting plate 211 is reciprocated about the axis of the trunnions 213 and the lifting pins 210 and 215 periodically raise and lower the vertically slidable plunger 74 and shaft 136 which respectively actuate the centering chucks 16 and bottle ejecting mechanism 26.

OPERATING INSTRUMENTALITIES FOR PERIODICALLY SWINGING THE BOTTLE EJECTING MECHANISM TOWARD AND AWAY FROM THE BOTTLE SUPPORTING CHUCKS

Referring now to Figs. 1, 3, 6, 9 and 19, a cam 230, hereafter referred to as the take out cam, is adjustably secured to the cam 200 for limited angular adjustment thereon by means of a series of stud and slot connections 231. The periphery of the cam 230 provides an irregular cam surface 229 which is designed for contact with an antifriction cam roller 232 which is supported medially upon a horizontally slidable link 233, the inner end of which is bifurcated as at 234 and straddles the main operating shaft 150 immediately below the cam 230. The bifurcated end of the link 233 is supported upon a plate 235 which is adjustably secured to the shaft 150 by means of a set screw 236. The outer end of the link 233 is pivotally connected by means of a pin 237 (Fig. 10) to the outer end of a short arm 238, the inner end of which is keyed as at 239 to the vertical shaft 136 which controls the operation of the bottle ejecting mechanism 26.

A bracket 240 is mounted upon the short arm 238 and a coil spring 241, one end of which is secured to the bracket 240 and the other end of which is anchored to the side wall 33 of the casing 10, normally applies a torque to the shaft 136 which maintains the roller 232 in contact with the cam surface 229 provided on the periphery of the cam 230. Thus it will be seen that as the main operating shaft 150 is rotated, the link 233 is moved longitudinally, or substantially so, toward and away from the axis of the shaft 150 and such movement thereof transmits periodic reciprocal rocking motion to the vertical shaft 136 thus causing the bottle supporting and ejecting arm 139 to be swung toward and away from its proximate bottle supporting chuck 15 to engage a bottle thereon or to release a discharged bottle as the case may be.

OPERATING INSTRUMENTALITIES FOR HOLDING THE CHUCK SUPPORTING TURRET

Referring now to Figs. 4 and 15, a notched wheel 250 is secured as at 251 to the extreme lower end of the vertical turret shaft 14 upon which the chuck supporting turret or spider 13 is mounted. The notches 252 which are provided in the periphery of the wheel 250 correspond in number to the number of supporting chucks 15 and, in the present instance, are circumferentially spaced from each other ninety degrees apart. Pivotally mounted upon a short stub shaft 253 which extends upwardly from the bottom 35 of the casing 10, and maintained thereon by means of a collar 254, is a holding detent 255, one end of which is provided with a tooth 256 adapted to successively enter the notches 252 provided on the periphery of the wheel 250 to maintain the wheel in any one of a number of positions. A coil spring 278 is secured at one end to the detent 255 medially thereof and the other end of the spring is adjustably secured as at 257 to the side wall 34 of the casing 10 in such a manner that the detent 255 is normally maintained in engagement with the wheel 250. The other end of the detent 255 extends outwardly from the pivotal axis thereof at an angle to the main body of the detent and is adapted to be engaged by a cam surface 258 provided on the periphery of a detent cam 259 which is mounted on the lower end of the main operating shaft 150 and is rotatable therewith through the medium of a second or turret cam 260 which is eccentrically mounted on the operating shaft 150 to which the former cam 259 is adjustably secured for angular adjustment thereon by means of stud and slot connections 261.

OPERATING INSTRUMENTALITIES FOR INDEXING THE TURRET

Disposed upon the shaft 14 and freely rotatable thereon, is a gear 262 provided with teeth 263 on the periphery thereof. The upper portion of the gear 262 is provided with a series of ratchet teeth 264. The teeth 264 are adapted to mesh with similar teeth 265 provided on the lower portion of a sleeve 266 which is keyed as at 267 to the shaft 14. The sleeve 266 is vertically slidable on the shaft 14 and the teeth 265 thereof are maintained in engagement with the teeth 264 provided on the gear 262 by means of a coil spring 268 which surrounds the shaft 14 and which bears at its upper end against a fixed collar 269 mounted on the shaft 14 and at its lower end against a slidable collar 270 which bears against the sleeve 266. Thus it will be seen that upon rotation of the gear 262 in one direction the teeth 264 and 265 will slip upon each other in such a manner that no rotational movement of the shaft 14 will result, while upon rotation of the gear 262 in the opposite direction, the teeth 264 and 265 will mesh and cause the gear 262 and sleeve 266, together with the shaft 14, to rotate in unison.

The teeth 263 which are provided on the periphery of the gear 262 are adapted to mesh with teeth 271 formed on a rack 272 provided on the outer free end of an indexing arm 273, the other end of which is pivotally mounted upon a stub shaft 274 which extends upwardly from the bottom 35 of the casing 10. The arm 273 is designed for reciprocation in a horizontal plane and toward this end, a cam roller 275 (Fig. 4) is mounted on the underneath side of the arm 273 medially of the ends thereof and is designed for contact with the periphery of the eccentrically disposed turret cam 260. A coil spring 276 is secured at one end thereof to the arm 273 and is adjustably secured as at 277 to the rear wall 32 of the casing 10 and thus, the cam roller 275 is maintained in yielding contact with the periphery of the turret cam 260.

It will be seen that as the main operating shaft 150 is rotated, reciprocal swinging motion in a horizontal plane is imparted to the arm 273 as the cam roller 275 rides around the periphery of the turret cam 260. Such reciprocation of the arm 273 causes reciprocation of the gear 262 which is loosely mounted on the shaft 14. During turning movement of the gear 262 in one direction, the holding detent 255 is in engagement with one of the notches 252 provided in the periphery of the notched wheel 250 and thus the shaft 14 is held stationary while the teeth 264 and 265 slip upon each other. During turning movement of the gear 262 in the other direction, the holding detent is withdrawn from its engagement with the notch 252 by the action of the cam surface 258 which engages the detent 255. The teeth 264 and 265 being in mesh, cause the sleeve 266 to rotate with the gear 262 throughout an angle of ninety degrees, at which time the detent 255 is released by the cam surface 258 of the detent cam 259 and falls into the next succeeding notch 252 formed in the periphery of the notched wheel 250. In this manner, the chuck-supporting turret 13 carried by the shaft 14 is periodically indexed in timed relation to the other operating instrumentalities so the machine and chucks 15 are moved from the receiving station *a* to the position *b*; from the position *b* to the decorating station *c*; from the decorating station *c* to the discharging station *d* and from the discharging station *d* back to the receiving station *a*.

OPERATION OF THE APPARATUS

*Main operating shaft in its initial position*

The various operating instrumentalities for indexing the chuck supporting turret 13; for actuating the squeegee arm 22; for reciprocating the stencil screen frame 88 and chuck rotating carriage 19; for moving the stencil screen frame 88 and chuck rotating carriage into and out of operative engagement with the bottles B and the supporting chucks 15 respectively; for raising and lowering the centering chucks 16; for raising and lowering the bottle take out arm 139; and for swinging the take out arm 139 toward and away from the bottle supporting chucks 15, have been described in detail and the manner in which they are individually operated from the main driving shaft 150 has been set forth. Collectively, the various elements just mentioned are operated in synchronism in such a manner that the proper sequence of events necessary for proper continuous decoration of the bottles B will take place in the machine automatically.

Referring now to Fig. 20 wherein there is diagrammatically or graphically illustrated the various phases of operation of the machine, the horizontal axis of the abscissae represent the various positions of the main operating shaft 150 throughout one revolution of the shaft at every ten degrees of angularity thereof. The vertical axis of the ordinates represents the various cam instrumentalities that are mounted upon the main operating shaft, each ordinate being illustrative of one complete cycle of operation of the particular phase of the apparatus which is exclusively controlled by its respective cam instrumentality.

For convenience of description, the initial position assumed by the main operating shaft 150 (Fig. 5) is such that the centering chuck 16 which overlies the empty supporting chuck 15 at the receiving station *a* is elevated so as to permit the insertion of a bottle on the empty supporting chuck 15, while at the same time the centering chuck 16 at the discharging station *d* is also elevated to permit removal of the decorated bottle B from the apparatus. In this position of the main operating shaft 150, the two centering chucks just referred to are elevated by virtue of the fact that the roller 216 (Fig. 19) is in contact with the elevated portion 225 of the cam surface 219 provided on the centering chuck cam 222 and thus the lifting plate 211 which controls the movement of the centering chucks 16 is elevated. This position of the centering chuck cam 222 is shown at P₁ in Fig. 20.

In this same initial position of the main operating shaft 150, the chuck supporting turret 13 is maintained in a fixed indexed position by virtue of the fact that the detent 255 (Fig. 14) is out of engagement with the cam surface 258 of the detent cam 259 and the detent tooth 256 extends into one of the notches 252 provided in the periphery of the notched wheel 250, thus maintaining the turret shaft 14 and turret 13 mounted thereon in a fixed indexed position. This position of the detent cam 259 is illustrated at P₂ in Fig. 20.

In the initial position of the main operating shaft 150, the horizontal swinging indexing arm 273 (Fig. 14) which forms an element of the turret indexing mechanism is in one extreme position thereof and is about to commence its inoperative resetting stroke during which the turret shaft 14 is held stationary by the detent 255 as just described. The cam roller 275 is in engagement with the extreme eccentric portion of the turret cam 260, the position of which is represented at P₃ in Fig. 20.

In the initial position of the main operating shaft, the centering chuck 16 at the position *b* (Fig. 16) is in engagement with the open mouth of the bottle B carried by the supporting chuck 15, not by virtue of the position of the centering chuck cam 222, but by virtue of the fact that in moving from the receiving station *a* to the intermediate position *b*, the thrust rod 68 has moved out of the range of the curved crosshead or lifting plate 76 and is no longer affected by its movements.

With the main operating shaft 150 in its initial position, the chuck rotating carriage 19 and the stencil screen frame 88 are in respective engagement with the supporting chuck 15 and bottle B carried thereby at the decorating station *c* (Fig. 16), by virtue of the fact that the cam roller 204 (Fig. 4) is in contact with the lower portion 199 of the screen carriage shifting cam 200. Thus the bell crank lever 205, 78, is in the extreme position thereof wherein the carriage 19 is in its innermost position. This position of the screen carriage shifting cam 200 is illustrated at P₄ in Fig. 20.

The squeegee S', in the initial position of the main operating shaft 150, is in contact with the stencil screen S (Fig. 16) at the decorating station c by virtue of the fact that the cam roller 183 (Fig. 6) has moved onto the inner cam surface 145 of the squeegee cam 181. The relatively short curved arm 184 which, together with the relatively long squeegee arm 22 (Fig. 16), form in effect a bell crank lever on the shaft 23, has moved inwardly toward the axis of the main operating shaft 150 and thus the squeegee S' is in its innermost position in contact with the screen S. The position of the squeegee cam 181 is illustrated in Fig. 20 at P₅.

With the main operating shaft 150 in its initial position, the chuck rotating carriage 19 and stencil screen frame 88 commence their operative decorating stroke longitudinally of the machine by virtue of the fact that the cam roller 188 (Fig. 3) is in contact with the trough portion 144 of the cam surface 187 provided on the screen carriage reciprocating cam 179. Thus the bell crank lever provided by the arms 189, 194, is in its uppermost position while the reciprocable arm 97 is in one extreme position thereof with the carriage 19 similarly in the extreme position it occupies at the commencement of the decorating stroke. This position of the carriage reciprocating cam 179 is illustrated in Fig. 20 at the position P₆.

At the discharging station d, in the initial position of the main operating shaft 150, the bottle ejecting or take out arm 139 is in its elevated position, with a bottle B suspended therefrom directly above the supporting chuck 15, prior to swinging movement thereof to carry the bottle outwardly from the chuck. The lifting plate 211 (Fig. 19) which has been shown to be elevated at P₁, serves to maintain the take out arm 139 elevated through the medium of the lifting pin 217 and shaft 136.

In the elevated position of the take out arm 139 just described, the arm is maintained in its innermost position with the bottle B suspended therefrom. The roller 232 has just begun to move inwardly on the cam surface 229 of the take out cam 230 to permit the bifurcated link 233 to be moved toward the axis of the shaft 150, thus causing the shaft 136 to turn about its axis in such a manner that the take out arm will be swung outwardly from the chuck 15. This position of the take out cam 230 is illustrated at P₇ in Fig. 20.

*Main operating shaft in a one hundred and sixty degree position of angularity*

Referring now to Fig. 20, during movement of the main operating shaft from its initial position throughout an angle of approximately one hundred and sixty degrees, the centering chucks 16 at the receiving station a and the discharging station d remain elevated; the detent 255 (Fig. 14) remains in its holding position in engagement with the notched wheel 250; the indexing arm 273 becomes reset prior to the next indexing operation of the turret 13; the chuck rotating carriage 19 and stencil screen frame 88 remain in engagement with the chuck 15 and bottle B at the decorating station c; the squeegee S' (Fig. 16) remains in contact with the stencil screen S; the chuck rotating carriage 19 and stencil screen frame 88 complete their operative decorating stroke; and the take out arm 139 (Fig. 1) remains elevated while swinging outwardly about the axis of the shaft 136, thus carrying the bottle B at the discharging station d outwardly.

In the one hundred and sixty degree position of angularity of the main operating shaft 150, the centering chucks 16 at the receiving station a and at the discharging station d commence to become lowered as controlled by the angularity of the centering chuck cam 222 in the position P₈. Likewise the take out arm 139 (Fig. 1) commences to become lowered to release the bottle carried thereby as controlled by the angularity of the take out cam 230 (Fig. 9) in the position P₉.

*Main operating shaft in a one hundred and sixty-five degree position of angularity*

As the main operating shaft reaches a position of angularity one hundred and sixty-five degrees from its initial position, the chuck rotating carriage 19 and stencil screen frame 88 commence to move outwardly away from the supporting chuck 15 and bottle B carried thereby as controlled by the angularity of the carriage shifting cam 200 in the position P₁₀. Likewise the squeegee S' commences to move outwardly away from the stencil screen S as controlled by the position of the squeegee cam 181 illustrated at P₁₁.

*Main operating shaft in a one hundred and seventy-five degree position of angularity*

At a position of one hundred and seventy-five degrees angularity from the initial position of the main operating shaft 150, the chuck rotating carriage 19 and stencil screen frame 88 reach the limit of their outward movement away from the supporting chuck 15 and bottle B carried thereby as controlled by the angularity of the carriage shifting cam 200 in the position P₁₂. Likewise the squeegee S' reaches its fully retracted position as controlled by the angularity of the squeegee cam 181 in the position P₁₃.

*Main operating shaft in a one hundred and eighty degree position of angularity*

With the main operating shaft at a position of one hundred and eighty degrees angularity from its initial position, the centering chucks 16 at the receiving station a and at the discharging station d become completely lowered as controlled by the angularity of the centering chuck cam 222 in the position P₁₄. The centering chuck 16 at the receiving station a engages the filling opening of the bottle B which has just been inserted on the chuck 15. The centering chuck at the discharging station d becomes lowered without significance inasmuch as the bottle B has been removed from the supporting chuck 15 by the take out arm 139. In this same position, the detent 255 becomes disengaged from the notch 252 in the notched wheel 250 as controlled by the angularity of the detent cam 259 in the position P₁₅. The chuck rotating carriage 19 and stencil screen frame 88 commence their inoperative return stroke as controlled by the angularity of the carriage reciprocating cam 179 in the position P₁₆. In this position the turret plate 13 commences its indexing operation as controlled by the angularity of the turret cam 260 in the position P₁₇. Likewise the take out arm 139, which has now been lowered, commences its return movement inwardly toward the supporting chuck 15 at the discharging station d as controlled by the angularity of the take out cam 230 in the position P₁₈.

Main operating shaft in a two hundred and seventy degree position of angularity When the main operating shaft 150 has reached a position of two hundred and seventy degrees angularity from its initial position, the take out arm 139 has returned to its inner lowered bottle engaging position as controlled by the angularity of the take out cam 230 in the position P₁₉.

Main operating shaft in a three hundred and forty degree position of angularity At a position of three hundred and forty degrees angularity of the main operating shaft 150, the indexing operation of the turret 13 is complete as illustrated by the position P₂₀. The various supporting chucks 15 and bottles B carried thereby have advanced ninety degrees with the turret 13 to the next succeeding position thereof. In this position the centering chucks 16 at the discharging station d and at the receiving station a commence to raise in unison as illustrated by the position P₂₁ to permit the take out arm 139 to discharge a decorated bottle B from the supporting chuck 15 at the station d and to permit an undecorated bottle to be inserted in the chuck 15 at the receiving station a. The take out arm 139 at the station d commences to raise as illustrated by the position P₂₂, carrying with it the bottle B which has been released by the centering chuck 16 just mentioned. The detent 255 is moved into the notch 252 in the notched wheel 250 as illustrated by the position P₂₃ to prevent the turret 13 from turning during the resetting operation of the indexing arm 273. The chuck rotating carriage 19 and stencil screen frame 88 conclude their return stroke as illustrated by the position P₂₄.

Main operating shaft in a position of three hundred and forty-five degrees angularity When the main operating shaft reaches a position of three hundred and forty-five degrees angularity from its initial position, the chuck rotating carriage 19 and the stencil screen frame 88 complete their outward movement away from the bottle supporting assembly 12 as illustrated by the position P₂₅. Simultaneously, the squeegee S' completes its outward movement as illustrated by the position P₂₆ to assume an inoperative position out of contact with the screen S.

Main operating shaft in a position of three hundred and fifty-five degrees

When the main operating shaft 150 reaches a position of three hundred and fifty-five degrees angularity from its initial position, the squeegee S' comes into operative decorating contact with the screen S as illustrated by the position P₂₇ prepartory to the commencement of the decorating stroke of the stencil screen S. Simultaneously, the chuck rotating carriage 19 and stencil screen S engage the newly presented chuck 15 and bottle B carried thereby at the decorating station c as indicated by the position P₂₈ and immediately thereafter the entire operation of the machine as described during one complete revolution of the main operating shaft 150 is repeated.

Modifications may be resorted to within the spirit and scope of the appended claims.

I claim:

1. The method of applying a decoration or lettering to the cylindrical side surface of a bottle which comprises moving a vertically disposed stencil screen and said surface relative to each other in tangential rolling line contact, positioning a squeegee in contact with the screen adjacent its line of contact with said surface, and moving the screen relative to the squeegee to force decorating material through said screen and onto said surface.

2. The method of applying a decoration or lettering to the cylindrical side surface of a bottle which consists in supporting said bottle for rotation about a vertical axis, passing a vertically disposed stencil screen in tangential rolling line contact with said side surface while simultaneously directing a stream of decorating material onto said screen in the vicinity of the line of contact between said screen and surface, positioning a squeegee in contact with the screen adjacent said line of contact, and moving the screen relative to the squeegee to force the decorating material applied to the screen through said screen and onto said surface.

3. The method of applying a design or lettering to the cylindrical side surface of a bottle which consists in positioning a squeegee in contact with one side of a vertically disposed stencil screen having pervious portions representing the design or lettering to be applied to said side surface, supporting said bottle for rotation about a vertical axis with said side surface in tangential rolling line contact with the other side of said screen substantially along the line of contact between said surface and screen, applying decorating material to said last mentioned side of said screen in the vicinity of said line of contact, and moving said screen relative to said squeegee and bottle to force the decorating material through the pervious portions of said screen and onto said surface.

4. In a machine for decorating bottles, a decorating station, means for supporting a bottle in an upright position for rotation about a vertical axis at said station, a vertically disposed stencil screen in the vicinity of said station, means for moving said screen and bottle into and out of tangential rolling line contact at said station, means for moving said screen horizontally in one direction in its own plane while in contact with said bottle, means for forcing decorating material through said screen and onto said bottle during such movement of said screen, and means for moving said screen horizontally in the opposite direction when the latter is out of contact with said bottle.

5. In a machine for decorating bottles, means for supporting a bottle in an upright position for rotation about a vertical axis, a vertically disposed stencil screen, means for moving said screen into and out of tangential rolling line contact with said bottle, means for moving said screen horizontally in its own plane in one direction while in contact with said bottle, means for forcing decorating material through said screen and onto said bottle during such movement of said screen, and means for moving said screen in the opposite direction when the latter is out of contact with said bottle.

6. In a machine for decorating bottles by a stenciling process, a receiving station, a decorating station, a rotatable bottle supporting chuck adapted to support thereon a bottle in an upright position for rotation about a vertical axis, means for moving said chuck from said receiving station to said decorating station, a carriage in the vicinity of said decorating station, a vertically disposed stencil screen and a chuck rotating element mounted on said carriage, means for moving said carriage inwardly toward and outwardly away from said chuck and bottle thereon at said decorating station to bring said screen into tangential rolling line contact with said bottle and to bring said element into tractional contact with said chuck, means for moving said carriage horizontally in one direction parallel to the plane of said screen when said carriage is in its innermost position, means for forcing decorating material through said screen and onto said bottle during such movement of the carriage, and means for moving said carriage in the opposite direction when the latter is in its outermost position.

7. In a stenciling machine, the combination with a vertically disposed receprocable stencil screen and a relatively stationary squeegee in vertical line contact therewith, of a dispensing apparatus for decorating enamel comprising a container for the enamel disposed below the level of said squeegee, a rotatable disk disposed above said container, the peripheral regions of said disk extending into said container below the level of the enamel therein, means for rotating said disk, and means for removing the enamel adhering to said disk and applying the same to said screen in the region of the line of contact between the screen and squeegee.

8. A stenciling apparatus comprising in combination a chuck supporting turret, said turret being capable of turning movement about a vertical axis, a plurality of bottle supporting chucks rotatably carried by said turret for rotation about a vertical axis, said chucks each being adapted to support thereon in an upright position a bottle to be decorated, means for periodically indexing said turret to convey said chucks and bottles thereon from a receiving station to a decorating station, a vertically disposed stencil screen in the vicinity of said decorating station, means synchronized with the indexing of said turret for moving said stencil screen inwardly toward and outwardly away from said turret to move said stencil screen into and out of contact with the side of a bottle supported on one of said chucks at said decorating station, means synchronized with the indexing of said turret for shifting said stencil screen laterally in its own plane in one direction when said screen is in its innermost position whereby tangential rolling line contact between said screen and bottle is effected, means for forcing decorating material through said screen and onto said bottle during lateral shifting of said screen, and means synchronized with the indexing of said turret for shifting said screen laterally in the other direction to return the same to its original position when said screen is in its outermost position.

9. A stenciling apparatus for decorating the cylindrical sides of bottles comprising in combination a chuck supporting turret, said turret being capable of turning movement about a vertical axis, a plurality of bottle supporting chucks rotatably carried by said turret for rotation about a vertical axis, said chucks each being adapted to support thereon in an upright position a bottle to be decorated, means for periodically indexing said turret to convey said chucks and bottles thereon from a receiving station to a decorating station, a stencil screen supporting and chuck rotating carriage in the vicinity of said decorating station, a vertically disposed stencil screen mounted on said carriage, a chuck rotating friction element mounted on said carriage, means synchronized with the indexing of said turret for moving said carriage inwardly toward and outwardly away from said turret to move said stencil screen into and out of tangential rolling line contact with the side of a bottle supported on one of said chucks at said decorating station and to move said friction element into and out of tractional engagement with said chuck, means synchronized with the indexing of said turret for shifting said carriage laterally in one direction parallel with the plane of said screen to rotate said chuck and bottle thereon when said screen is in its innermost position in contact with said bottle, means for forcing decorating material through said screen and onto said bottle during lateral shifting of said carriage, and means synchronized with the indexing of said turret for shifting said carriage laterally in the other direction to return the same to its initial position when said screen is in its outermost position.

10. In a stenciling apparatus for decorating the cylindrical sides of bottles, a chuck supporting turret, said turret being capable of turning movement about a vertical axis, a plurality of bottle supporting chucks rotatably carried by said turret for rotation about a vertical axis, said chucks each being adapted to support thereon in an upright position a bottle to be decorated, means for periodically indexing said turret to convey said chucks from a receiving station to a decorating station and from said decorating station to a discharging station, a plurality of vertically movable centering chucks carried by said turret above said supporting chucks, said centering chucks corresponding in number to the number of said supporting chucks and being in vertical alignment therewith, said centering chucks being movable with said turret from the receiving station to the decorating station and from the decorating station to the discharging station and being adapted to descend upon the bottles carried by said supporting chucks to maintain the same in position thereon, means for decorating said bottles at said decorating station, means for discharging said bottles from the apparatus at said discharging station, and means synchronized with the indexing of said turret for causing said centering chucks to become elevated at said receiving station to permit the insertion of a bottle onto the supporting chuck at said station, to become lowered at said decorating station, and to become elevated at said discharging station to permit said discharging means to become operative.

11. In a stenciling apparatus for decorating the cylindrical sides of bottles, a chuck supporting turret, said turret being capable of turning movement about a vertical axis, a plurality of bottle supporting chucks rotatably supported on said turret for rotation about a vertical axis, said chucks each being adapted to support thereon in an upright position a bottle to be decorated, a main operating shaft, cam means on said shaft for periodically indexing said turret to convey said chucks from a receiving station to a decorating station and from said decorating station to a discharging station, a plurality of vertically movable centering chucks carried by said turret above said supporting chucks, said centering chucks corresponding in number to the number of said supporting chucks and being in vertical alignment therewith, said centering chucks being movable with said turret from the receiving station to the decorating station and from the decorating station to the discharging station and being adapted to descend upon the bottles carried by said supporting chucks to maintain the same in position thereon, means for decorating said bottles at said decorating station, means for discharging the decorated bottles from the apparatus at said discharging station, and cam means on said main operating shaft for causing said centering chucks to become elevated at said receiving station to permit the insertion of the bottles onto the supporting chucks at said station, to become lowered at said decorating station, and to become elevated at said discharging station to permit the bottles to be removed from the apparatus by said discharging means.

12. In a stenciling apparatus for decorating the cylindrical sides of bottles, a chuck supporting turret, said turret being capable of turning movement about a vertical axis, said chucks each being adapted to support thereon in an upright position a bottle to be decorated, a main operating shaft, cam means on said shaft for periodically indexing said turret to convey said chucks and bottles from a receiving station to a decorating station and from said decorating station to a discharging station, means in the vicinity of said decorating station for applying a decoration to the sides of said bottles, means in the vicinity of said discharging station for conveying the decorated bottles from the apparatus, said decorating means being movable into and out of decorating engagement with said bottles, cam means on said main operating shaft for moving said decorating means into and out of decorating engagement with said bottles, and cam means on said main operating shaft for actuating said discharging means.

13. In a stenciling apparatus for decorating the cylindrical sides of bottles, a chuck supporting turret, said turret being capable of turning movement about a vertical axis, said chucks each being adapted to support thereon one of the bottles to be decorated, a plurality of centering chucks corresponding in number to the number of said supporting chucks and disposed thereabove in vertical alignment therewith, said chucks being vertically movable from a position in contact with said bottles to an elevated position out of contact therewith, means for indexing said turret to convey said supporting and centering chucks from a receiving station to a decorating station and from said decorating station to a discharging station, a vertically disposed stencil screen movable toward and away from said turret in the vicinity of said decorating station for periodically contacting a bottle to be decorated at said station, means for moving said screen toward and away from said turret, means for reciprocating said screen horizontally in the plane thereof to periodically establish tangential rolling line contact between said screen and bottles, a squeegee movable into and out of contact with said screen for periodically forcing decorating material through the screen and onto said bottles, means for moving said squeegee into and out of contact with said screen, a take out arm for removing said bottles from the apparatus at said discharging station, and means for actuating said take out arm.

14. The method of applying decorations to the cylindrical sides of bottles which consists in bringing said bottles successively into an upright position at a decorating station, periodically moving a stencil screen into vertical tangential rolling line contact with the cylindrical sides of said bottles, periodically moving said screen laterally in its own plane while simultaneously rotating said bottles and forcing decorating material through said screen onto the sides thereof, and moving the successively decorated bottles from said station.

15. In a stenciling machine, a bottle supporting chuck, said chuck being rotatable about a vertical axis and being adapted to support thereon in a vertical position a bottle, the cylindrical sides of which are to be decorated, a stencil screen supporting and chuck rotating carriage, a vertically disposed stencil screen mounted upon said carriage, a friction element mounted on said carriage, means for moving said carriage toward and away from said chuck to cause said screen to engage the bottle thereon and to cause said friction element to engage said chuck, and means for moving said carriage in one direction parallel to the plane of said screen when said screen and friction element are in contact with said bottle and chuck respectively and for moving said carriage in the opposite direction when said screen and friction element are out of contact with said bottle chuck respectively.

16. The method of decorating an article having a cylindrical side which consists in rotating said article about the axis of said cylindrical side while simultaneously passing a stencil screen having pervious portions representing the design to be applied to said side in tangential rolling line contact with said side, flowing a stream of decorating material onto said screen and across said pervious portions thereof parallel to the line of contact between said side and screen, positioning a squeegee in contact with said screen adjacent said line of contact, and moving said screen relative to the squeegee to force a small portion of said material through said pervious portions by the spreading action thereof.

17. The method of decorating the cylindrical side of a bottle which consists in rotating said bottle about a vertical axis while simultaneously establishing tangential rolling line contact between said cylindrical side and a vertically disposed stencil screen, flowing a stream of decorating material by gravity across said screen and forcing a small quantity of said stream through said screen by the spreading action of a squeegee.

18. In an apparatus for decorating vertically disposed surfaces, a vertically disposed stencil screen against which said surface is adapted to be positioned, means for discharging a stream of decorating material onto said screen adjacent the top thereof, a squeegee in contact with said screen, and means for moving said squeegee and screen relative to each other to cause said squeegee to spread said stream over the surface of said screen and force a small amount thereof through said screen and onto said article.

THEODORE H. SLOAN.